(12) United States Patent
Matsubara et al.

(10) Patent No.: US 11,807,103 B2
(45) Date of Patent: Nov. 7, 2023

(54) CONTROL DEVICE FOR VEHICLE

(71) Applicants: TOYOTA JIDOSHA KABUSHIKI KAISHA, Toyota (JP); AISIN CORPORATION, Kariya (JP)

(72) Inventors: Keigo Matsubara, Nagoya (JP); Masayuki Baba, Toyota (JP); Tomoya Inayoshi, Anjo (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 129 days.

(21) Appl. No.: 17/493,142

(22) Filed: Oct. 4, 2021

(65) Prior Publication Data
US 2022/0111719 A1 Apr. 14, 2022

(30) Foreign Application Priority Data
Oct. 9, 2020 (JP) .................................. 2020-171554

(51) Int. Cl.
*B60K 6/387* (2007.10)
*B60W 20/40* (2016.01)
(Continued)

(52) U.S. Cl.
CPC ................ *B60K 6/387* (2013.01); *B60K 6/48* (2013.01); *B60W 10/0235* (2020.02);
(Continued)

(58) Field of Classification Search
CPC . B60K 6/387; B60K 6/48; B60K 6/26; B60K 2006/268; B60K 2006/4825;
(Continued)

(56) References Cited

U.S. PATENT DOCUMENTS 8,864,623 B2 10/2014 Doering et al.
9,139,077 B2 9/2015 Yoshikawa et al.
(Continued)

FOREIGN PATENT DOCUMENTS

CN 103260982 A 8/2013
CN 103391868 A 11/2013
(Continued)

OTHER PUBLICATIONS

Aug. 31, 2022, Office Action issued in U.S. Appl. No. 17/460,765.
(Continued)

*Primary Examiner* — George C Jin
(74) *Attorney, Agent, or Firm* — Oliff PLC

(57) ABSTRACT

An electronic control unit is configured to: output a first command value to the hydraulic control circuit system and then output a second command value to the hydraulic control circuit system during a transition in which the control state of the clutch is switched from a disengaged state to an engaged state when starting the engine; perform first control in which the motor outputs the cranking torque, and second control in which the engine starts operation, when starting the engine; and when the vehicle is in a predetermined state in which a required hydraulic pressure is not secured stably when starting the engine, start output of the first command value when the vehicle is not in the predetermined state, the required hydraulic pressure being a hydraulic pressure supplied from the hydraulic control circuit system to the clutch actuator and required to switch the control state of the clutch.

8 Claims, 6 Drawing Sheets

(51) Int. Cl.
    *B60K 6/48*     (2007.10)
    *B60W 10/02*    (2006.01)
    *B60W 10/08*    (2006.01)
    *B60K 6/26*     (2007.10)
    *B60W 10/06*    (2006.01)

(52) U.S. Cl.
    CPC ....... *B60W 20/40* (2013.01); *B60K 2006/268* (2013.01); *B60W 10/06* (2013.01); *B60W 10/08* (2013.01); *B60W 2510/0225* (2013.01); *B60W 2510/06* (2013.01); *B60W 2710/021* (2013.01)

(58) Field of Classification Search
    CPC ........... B60W 10/023; B60W 10/0235; B60W 10/06; B60W 10/08; B60W 10/02; B60W 20/40; B60W 20/00; B60W 2510/0225; B60W 2510/06; B60W 2710/021; B60W 2710/083
    See application file for complete search history.

(56) References Cited

U.S. PATENT DOCUMENTS

| | | | |
|---|---|---|---|
| 9,969,395 | B1 | 5/2018 | Dlugoss |
| 2007/0056784 | A1* | 3/2007 | Joe .................... B60L 58/12 180/65.245 |
| 2007/0179695 | A1 | 8/2007 | Reinke et al. |
| 2009/0234524 | A1* | 9/2009 | Kim ................ B60W 10/06 701/22 |
| 2009/0264249 | A1 | 10/2009 | Gloge |
| 2013/0211654 | A1 | 8/2013 | Tanisshima et al. |
| 2013/0331228 | A1 | 12/2013 | Miyazaki et al. |
| 2014/0172213 | A1 | 6/2014 | Park et al. |
| 2014/0336904 | A1* | 11/2014 | Nakanishi ............... B60K 6/48 701/110 |
| 2017/0015308 | A1* | 1/2017 | Ortmann ............... B60W 10/02 |
| 2018/0031055 | A1 | 2/2018 | Kitamura et al. |
| 2018/0148044 | A1* | 5/2018 | Kobayashi ............ B60K 6/445 |
| 2019/0249756 | A1 | 8/2019 | Washio |
| 2019/0291716 | A1* | 9/2019 | Kasahara ............... B60W 10/02 |
| 2020/0079351 | A1* | 3/2020 | Li ......................... B60W 20/13 |
| 2020/0262412 | A1 | 8/2020 | Baba et al. |
| 2021/0086775 | A1* | 3/2021 | Blue ..................... B60W 10/08 |
| 2022/0097678 | A1 | 3/2022 | Matsubara et al. |
| 2022/0097679 | A1 | 3/2022 | Matsubara et al. |
| 2022/0097680 | A1 | 3/2022 | Matsubara et al. |
| 2022/0227218 | A1 | 7/2022 | Matsubara et al. |

FOREIGN PATENT DOCUMENTS

| | | |
|---|---|---|
| JP | 2011-213310 A | 10/2011 |
| JP | 2012-066787 A | 4/2012 |
| JP | 2015-051728 A | 3/2015 |
| JP | 2016-008016 A | 1/2016 |
| JP | 2017-067106 A | 4/2017 |
| JP | 2018-017385 A | 2/2018 |
| JP | 2018-030507 A | 3/2018 |
| JP | 2019-138407 A | 8/2019 |
| JP | 2020-131788 A | 8/2020 |

OTHER PUBLICATIONS

U.S. Appl. No. 17/460,765, filed Aug. 30, 2021, in the name of Keigo Matsubara et al.

Dec. 9, 2022 Notice of Allowance issued in U.S. Appl. No. 17/460,765.

* cited by examiner

FIG. 3

PHASE DEFINITIONS FOR K0 CONTROL

| NAME OF PHASE | DEFINITION OF STATE |
|---|---|
| K0 STAND-BY | STAND BY WITHOUT STARTING K0 CONTROL DURING STARTING |
| QUICK APPLICATION | IN ORDER TO QUICKLY COMPLETE PACKING, TEMPORARILY APPLY HIGH HYDRAULIC PRESSURE AND IMPROVE INITIAL RESPONSE OF HYDRAULIC PRESSURE |
| CONSTANT-PRESSURE STAND-BY AT TIME OF PACKING | STAND BY AT CONSTANT PRESSURE, IN ORDER TO COMPLETE PACKING |
| K0 CRANKING | CRANK ENGINE USING K0 CLUTCH |
| QUICK DRAIN | IN ORDER TO QUICKLY STAND BY AT PACK END PRESSURE, TEMPORARILY OUTPUT LOW HYDRAULIC PRESSURE AND IMPROVE INITIAL RESPONSE OF HYDRAULIC PRESSURE |
| CONSTANT-PRESSURE STAND-BY BEFORE REENGAGEMENT | STAND BY AT PREDETERMINED TORQUE SO AS NOT TO DISTURB COMPLETE COMBUSTION OF ENGINE |
| ROTATION SYNCHRONIZATION INITIAL PERIOD | ASSIST RISE IN ENGINE ROTATIONAL SPEED BY CONTROLLING K0 TORQUE, IN ORDER TO QUICKLY SYNCHRONIZE ENGINE ROTATIONAL SPEED AND MG ROTATIONAL SPEED |
| ROTATION SYNCHRONIZATION MIDDLE PERIOD | CONTROL K0 TORQUE SUCH THAT ENGINE HAS APPROPRIATE BLOWING AMOUNT |
| ROTATION SYNCHRONIZATION FINAL PERIOD | SYNCHRONIZE ENGINE ROTATIONAL SPEED AND MG ROTATIONAL SPEED BY CONTROLLING K0 TORQUE |
| ENGAGEMENT TRANSITION SWEEP | ENGAGE K0 CLUTCH |
| COMPLETE ENGAGEMENT TRANSITION SWEEP | COMPLETELY ENGAGE K0 CLUTCH (TO ACHIEVE SAFETY FACTOR THAT ENSURES ENGAGEMENT) |
| COMPLETE ENGAGEMENT | MAINTAIN COMPLETELY ENGAGED STATE OF K0 CLUTCH |
| BACK-UP SWEEP | ENGAGE K0 CLUTCH (BACK-UP CONTROL) |
| CALCULATION SUSPENSION | SUSPEND CALCULATION OF TORQUE AND HYDRAULIC PRESSURE DURING EXECUTION OF FAIL-SAFE |

CONTROL DEVICE FOR VEHICLE

CROSS-REFERENCE TO RELATED APPLICATION

This application claims priority to Japanese Patent Application No. 2020-171554 filed on Oct. 9, 2020, incorporated herein by reference in its entirety.

BACKGROUND

1. Technical Field

The present disclosure relates to a control device for a vehicle including an engine, a motor, and a clutch that can couple and decouple the engine and the motor to and from each other.

2. Description of Related Art

There is well known a control device for a vehicle including an engine, a motor coupled to a power transmission path between the engine and drive wheels so as to be able to transmit power, and a clutch which is provided between the engine and the motor in the power transmission path and the control state of which is switchable by controlling a hydraulic clutch actuator. Japanese Unexamined Patent Application Publication No. 2015-51728 (JP 2015-51728 A) describes an example of such a control device for a hybrid vehicle. JP 2015-51728 A discloses that, during starting control for an engine, cranking of the engine is started with a command value for a hydraulic pressure to be supplied to a clutch actuator set to a precharge hydraulic pressure raised stepwise since the time when a start request for the engine is output and thereafter set to a hydraulic pressure gradually increased from a hydraulic pressure lowered stepwise.

SUMMARY

In some cases, a hydraulic pressure required for switching of the control state of a clutch during starting of the engine is not secured stably when a start request for the engine is output. When starting of the engine is started in such cases, the control state of the clutch may not be switched as intended, and drivability may be deteriorated because of occurrence of a starting shock, a reduction in the starting response, etc. For example, the hydraulic pressure is lowered when the flow rate of hydraulic oil supplied from an oil pump to a hydraulic control circuit that supplies an adjusted hydraulic pressure to the clutch actuator is insufficient for a required flow rate. Therefore, the state in which a required hydraulic pressure is secured stably is equivalent to a state in which a required flow rate of hydraulic oil is secured stably.

The present disclosure has been made with the foregoing circumstances as the background, and therefore has an object to provide a vehicle control device that can suppress deterioration in drivability when starting an engine.

An aspect of the present disclosure relates to a control device for a vehicle including an engine, a motor coupled to a power transmission path between the engine and drive wheels so as to be able to transmit power, a clutch that is provided between the engine and the motor in the power transmission path and a control state of which is switchable by controlling a hydraulic clutch actuator, and a hydraulic control circuit system that supplies an adjusted hydraulic pressure to the clutch actuator. The control device includes an electronic control unit configured to: output a first command value to the hydraulic control circuit system and then output a second command value to the hydraulic control circuit system during a transition in which the control state of the clutch is switched from a disengaged state to an engaged state when starting the engine, the second command value being a command value for supplying the hydraulic pressure to the clutch actuator such that the clutch transmits cranking torque for raising a rotational speed of the engine, and the first command value being a command value for supplying the hydraulic pressure to the clutch actuator so as to reduce a pack clearance in the clutch; perform first control in which the motor outputs the cranking torque, and second control in which the engine starts operation, when starting the engine; and when the vehicle is in a predetermined state in which a required hydraulic pressure is not secured stably when starting the engine, start output of the first command value when the vehicle is not in the predetermined state, the required hydraulic pressure being a hydraulic pressure supplied from the hydraulic control circuit system to the clutch actuator and required to switch the control state of the clutch.

According to the above aspect, when a stand-by determination is present since a hydraulic pressure supplied from the hydraulic control circuit to the clutch actuator and required for switching of the control state of the clutch is not secured stably when starting the engine, output of the hydraulic pressure command value for rapid filling is started when the stand-by determination is absent. Thus, the engine can be started appropriately when a hydraulic pressure required for switching of the control state of the clutch is secured stably during starting of the engine. For example, output of the hydraulic pressure command value for rapid filling can be started after waiting for a state in which the control state of the clutch can be switched reliably and stably, and the initial response of the hydraulic pressure for the clutch actuator can be improved as intended. Hence, it is possible to suppress deterioration in drivability when starting the engine.

In the above aspect, the vehicle may be in the predetermined state when an automatic transmission is in a transition of shift control, the automatic transmission being provided between the motor and the drive wheels to establish different gear ratios in accordance with the hydraulic pressure adjusted by and supplied from the hydraulic control circuit system.

According to the above aspect, in addition, it is determined that the stand-by determination is present when the automatic transmission is in a transition of shift control. Thus, the control stands by to start output of the hydraulic pressure command value for rapid filling when there is a possibility that it is difficult to secure the flow rate of hydraulic oil required for switching of the control state of the clutch during starting of the engine since the automatic transmission is in a transition of shift control.

In the above aspect, the automatic transmission may be configured to include plurality of hydraulic engagement devices to each of which the adjusted hydraulic pressure is supplied from the hydraulic control circuit system, and establish one of a plurality of gear stages through engagement of any of the hydraulic engagement devices; The automatic transmission may be in the transition of the shift control when a third command value for supplying the hydraulic pressure to an engagement-side engagement device so as to reduce a pack clearance in the engagement-side engagement device is output to the hydraulic control circuit system; and The engagement-side engagement device may be an engagement device to be switched to the engaged state, among the engagement devices.

According to the above aspect, in addition, the automatic transmission is in a transition of shift control when the hydraulic pressure command value for rapid filling, in which a hydraulic pressure is supplied to the engagement-side engagement device so as to quickly bring the engagement-side engagement device into the packing completed state during the transition of shift control, is output to the hydraulic control circuit. Thus, the control stands by to start output of the hydraulic pressure command value for rapid filling during control for quickly bringing the engagement-side engagement device into the packing completed state, during which there is a high possibility that it is difficult to secure a flow rate of hydraulic oil required for switching of the control state of the clutch during starting of the engine.

In the above aspect, the vehicle may be in the predetermined state for a period since a time when control that is executed when the vehicle is stationary with operation of the engine stopped and in which a load on the motor is reduced is ended until a time when a first predetermined time for which it is considered to be difficult to secure the required hydraulic pressure elapses, when a source pressure for the hydraulic pressure to be supplied to the clutch actuator is supplied from a vehicle oil pump that is driven by power of the motor to the hydraulic control circuit system.

According to the above aspect, in addition, it is determined that the stand-by determination is present for a period since the time when control for reducing a load on the motor is ended until the time when the first predetermined time, for which it is considered to be difficult to secure the required hydraulic pressure, elapses. Thus, the control stands by to start output of the hydraulic pressure command value for rapid filling when there is a possibility that it is difficult to secure a flow rate of hydraulic oil required for switching of the control state of the clutch during starting of the engine since the rotational speed of the motor which drives the vehicle oil pump is low, such as immediately after control for reducing a load on the motor is ended.

In the above aspect, the vehicle may be in the predetermined state for a period since a time when different control for the clutch that is different from switching of the control state of the clutch during starting of the engine is ended until a time when a second predetermined time for which it is considered to be difficult to stabilize the required hydraulic pressure elapses, when the different control for the clutch is executed.

According to the above aspect, in addition, it is determined that the stand-by determination is present for a period since the time when different control for the clutch that is different from switching of the control state of the clutch during starting of the engine is ended until the time when the second predetermined time, for which it is considered to be difficult to secure the required hydraulic pressure, elapses. Thus, the control stands by to start output of the hydraulic pressure command value for rapid filling when there is a possibility that it is difficult to stabilize a hydraulic pressure required for switching of the control state of the clutch during starting of the engine because of the effect of the different control for the clutch, such as immediately after the different control is ended.

In the above aspect, when a source pressure for the hydraulic pressure to be supplied to the clutch actuator is supplied from a vehicle oil pump that is driven by power of the motor to the hydraulic control circuit system, the vehicle may be in the predetermined state while: a rotational speed of the motor is fluctuating in idling control for the motor executed when the vehicle is stationary with operation of the engine stopped; or a period since a time when fluctuations in the rotational speed of the motor in the idling control subside until a time when a third predetermined time for which it is considered to be difficult to stabilize the required hydraulic pressure elapses.

According to the above aspect, in addition, it is determined that the stand-by determination is present while the rotational speed of the motor is fluctuating in idling control for the motor, or for a period since the time when fluctuations in the rotational speed of the motor in idling control for the motor subside until the time when the third predetermined time, for which it is considered to be difficult to stabilize the required hydraulic pressure, elapses. Thus, the control stands by to start output of the hydraulic pressure command value for rapid filling when there is a possibility that it is difficult to stabilize a flow rate of hydraulic oil required for switching of the control state of the clutch during starting of the engine since the rotational speed or output torque of the motor which drives the vehicle oil pump is unstable, such as while or immediately after the idling rotational speed of the motor is fluctuating.

In the above aspect, the vehicle may be in the predetermined state during: switching of a control state of a direct clutch; or a period since a time when the switching of the control state of the direct clutch is completed until a time when a fourth predetermined time for which it is considered to be difficult to stabilize the required hydraulic pressure elapses, wherein the direct clutch may be a clutch that couples input and output rotary members of a hydraulic power transmission device provided between the motor and the drive wheels in the power transmission path and the control state of which is switchable in accordance with the hydraulic pressure adjusted by and supplied from the hydraulic control circuit system.

According to the above aspect, in addition, it is determined that the stand-by determination is present during switching of the control state of the direct clutch which couples the input and output rotary members of the hydraulic power transmission device, or for a period since the time when switching of the control state of the direct clutch is completed until the time when the fourth predetermined time, for which it is considered to be difficult to stabilize the required hydraulic pressure, elapses. Thus, the control stands by to start output of the hydraulic pressure command value for rapid filling when there is a possibility that it is difficult to stabilize a flow rate of hydraulic oil required for switching of the control state of the clutch during starting of the engine since the control state of the direct clutch is varying or has just varied.

In the above aspect, the electronic control unit may be configured to start output of the first command value without standing by when the vehicle is not in the predetermined state when starting the engine.

According to the above aspect, in addition, when the stand-by determination is absent when starting the engine, output of the hydraulic pressure command value for rapid filling is started without standing by. Thus, the engine can be started quickly when a hydraulic pressure required for switching of the control state of the clutch during starting the engine is secured stably.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a table indicating various phases in phase definitions for K0 control;

DETAILED DESCRIPTION OF EMBODIMENTS

An embodiment of the present disclosure will be described in detail below with reference to the drawings.

Figure 1:
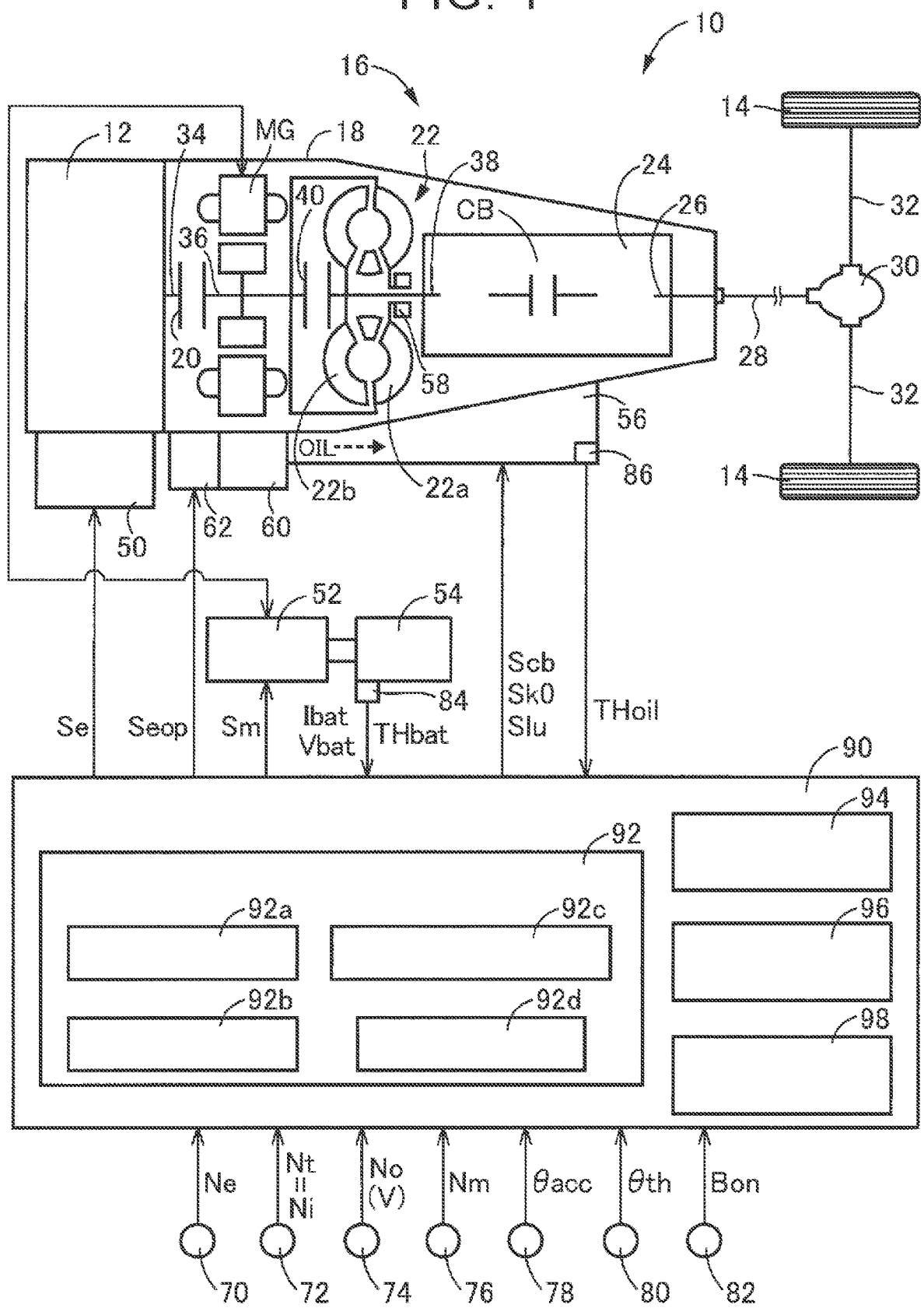
FIG. 1 illustrates a schematic configuration of a vehicle to which the present disclosure is applied, illustrating an essential portion of the control function and the control system for various types of control for the vehicle.

FIG. 1 illustrates a schematic configuration of a vehicle 10 to which the present disclosure is applied, illustrating an essential portion of the control function and the control system for various types of control for the vehicle 10. In FIG. 1, the vehicle 10 is a hybrid vehicle including an engine 12 and a motor MG which are drive force sources for travel. The vehicle 10 also includes drive wheels 14 and a power transmission device 16 provided in a power transmission path between the engine 12 and the drive wheels 14.

The engine 12 is a known internal combustion engine such as a gasoline engine and a diesel engine. Engine torque Te, which is output torque of the engine 12, is controlled by an electronic control unit 90, to be discussed later, controlling an engine control device 50, which includes a throttle actuator, a fuel injection device, an ignition device, etc. provided in the vehicle 10.

The motor MG is a rotary electric machine that has a function as an electric motor that generates mechanical power from electric power and a function as an electric generator that generates electric power from mechanical power, and is a so-called motor/generator. The motor MG is connected to a battery 54 provided in the vehicle 10 via an inverter 52 provided in the vehicle 10. MG torque Tm, which is output torque of the motor MG, is controlled by the electronic control unit 90, to be discussed later, controlling the inverter 52. When the rotational direction of the motor MG is positive, that is, the same rotational direction as during operation of the engine 12, for example, the MG torque Tm is power-running torque when the torque is positive on the acceleration side, and regeneration torque when the torque is negative on the deceleration side. Specifically, the motor MG generates power for travel using electric power supplied from the battery 54 via the inverter 52, in place of or in addition to the engine 12. The motor MG also generates electric power using power of the engine 12 or a driven force input from the side of the drive wheels 14. The electric power generated by the motor MG is accumulated in the battery 54 via the inverter 52. The battery 54 is a power accumulation device that exchanges electric power with the motor MG. The "electric power" is a synonym for "electric energy" unless specifically differentiated. The "power" is a synonym for "torque" and a "force" unless specifically differentiated.

The power transmission device 16 includes a K0 clutch 20, a torque converter 22, an automatic transmission 24, etc. provided in a case 18 which is a non-rotary member attached to the vehicle body. The K0 clutch 20 is a clutch provided between the engine 12 and the motor MG in the power transmission path between the engine 12 and the drive wheels 14. The torque converter 22 is coupled to the engine 12 via the K0 clutch 20. The automatic transmission 24 is coupled to the torque converter 22, and interposed in a power transmission path between the torque converter 22 and the drive wheels 14. Each of the torque converter 22 and the automatic transmission 24 constitutes a part of the power transmission path between the engine 12 and the drive wheels 14. The power transmission device 16 also includes a propeller shaft 28 coupled to a transmission output shaft 26 which is an output rotary member of the automatic transmission 24, a differential gear 30 coupled to the propeller shaft 28, a pair of drive shafts 32 coupled to the differential gear 30, etc. The power transmission device 16 also includes an engine coupling shaft 34 that couples the engine 12 and the K0 clutch 20 to each other, a motor coupling shaft 36 that couples the K0 clutch 20 and the torque converter 22 to each other, etc.

The motor MG is coupled to the motor coupling shaft 36 so as to be able to transmit power in the case 18. The motor MG is coupled to the power transmission path between the engine 12 and the drive wheels 14, particularly a power transmission path between the K0 clutch 20 and the torque converter 22, so as to be able to transmit power. That is, the motor MG is coupled to the torque converter 22 and the automatic transmission 24, not via the K0 clutch 20, so as to be able to transmit power. When seen from a different point of view, each of the torque converter 22 and the automatic transmission 24 constitutes a part of a power transmission path between the motor MG and the drive wheels 14. That is, each of the torque converter 22 and the automatic transmission 24 is provided between the motor MG and the drive wheels 14 in the power transmission path between the engine 12 and the drive wheels 14. Each of the torque converter 22 and the automatic transmission 24 transmits a drive force from each of the drive force sources, namely the engine 12 and the motor MG, to the drive wheels 14.

The torque converter 22 includes a pump vane wheel 22a coupled to the motor coupling shaft 36 and a turbine vane wheel 22b coupled to a transmission input shaft 38 which is an input rotary member of the automatic transmission 24. The pump vane wheel 22a is coupled to the engine 12 via the K0 clutch 20, and directly coupled to the motor MG. The pump vane wheel 22a is an input member of the torque converter 22. The turbine vane wheel 22b is an output member of the torque converter 22. The motor coupling shaft 36 also serves as an input rotary member of the torque converter 22. The transmission input shaft 38 also serves as an output rotary member of the torque converter 22 which is formed integrally with a turbine shaft rotationally driven by the turbine vane wheel 22b. The torque converter 22 is a hydraulic power transmission device that transmits a drive force from each of the drive force sources (the engine 12 and the motor MG) to the transmission input shaft 38 via a fluid. The torque converter 22 includes an LU clutch 40 that couples the pump vane wheel 22a and the turbine vane wheel 22b to each other. The LU clutch 40 is a direct clutch that couples the input and output rotary members of the torque converter 22 to each other, that is, a known lock-up clutch.

The operation state, that is, the control state, of the LU clutch 40 is switched by varying LU clutch torque Tlu, which is the torque capacity of the LU clutch 40, in accordance with an LU hydraulic pressure PRlu, which is a hydraulic pressure adjusted by and supplied from a hydraulic control circuit system 56 provided in the vehicle 10. The control state of the LU clutch 40 includes a completely disengaged state in which the LU clutch 40 is disengaged, a slip state in which the LU clutch 40 is engaged with slipping, and a completely engaged state in which the LU clutch 40 is engaged. When the LU clutch 40 is in the completely disengaged state, the torque converter 22 is in a torque converter state in which the torque amplification function can be obtained. When the LU clutch 40 is in the completely engaged state, meanwhile, the torque converter 22 is in a lock-up state in which the pump vane wheel 22a and the turbine vane wheel 22b are rotated together.

The automatic transmission 24 is a known automatic transmission of a planetary gear type, which includes one or more sets of planetary gear devices (not illustrated) and a plurality of engagement devices CB, for example. The engagement devices CB are hydraulic friction engagement devices composed of a clutch and a brake of a multi-plate or single-plate type pressed by a hydraulic actuator, a band brake tightened by a hydraulic actuator, etc., for example. The control state, such as an engaged state and a disengaged state, of each of the engagement devices CB is switched by varying CB torque Tcb, which is the torque capacity of each engagement device CB, in accordance with a CB hydraulic pressure PRcb, which is a hydraulic pressure adjusted by and supplied from the hydraulic control circuit system 56.

The automatic transmission 24 is a stepped transmission in which one of a plurality of shift gears (also referred to as "gear stages") with different speed ratios (also referred to as "gear ratios") γat (=AT input rotational speed Ni/AT output rotational speed No) is established by engaging some of the engagement devices CB. The automatic transmission 24 is an automatic transmission that establishes different gear ratios in accordance with the CB hydraulic pressure PRcb which is adjusted by and supplied from the hydraulic control circuit system 56. In the automatic transmission 24, for example, the gear stage to be established is switched, that is, a plurality of gear stages is selectively established, in accordance with an accelerator operation by a driver, a vehicle speed V, etc., by the electronic control unit 90 to be discussed later. The AT input rotational speed Ni is the rotational speed of the transmission input shaft 38, and an input rotational speed of the automatic transmission 24. The AT input rotational speed Ni is also the rotational speed of the output rotary member of the torque converter 22, and is equal to a turbine rotational speed Nt which is an output rotational speed of the torque converter 22. The AT input rotational speed Ni can be represented using the turbine rotational speed Nt. The AT output rotational speed No is the rotational speed of the transmission output shaft 26, and an output rotational speed of the automatic transmission 24.

The K0 clutch 20 is a friction engagement device of a wet or dry type, which is constituted of a multi-plate or single-plate clutch pressed by a hydraulic clutch actuator 120 to be discussed later, for example. The control state, such as an engaged state and a disengaged state, of the K0 clutch 20 is switched by the electronic control unit 90, to be discussed later, controlling the clutch actuator 120.

Figure 2:
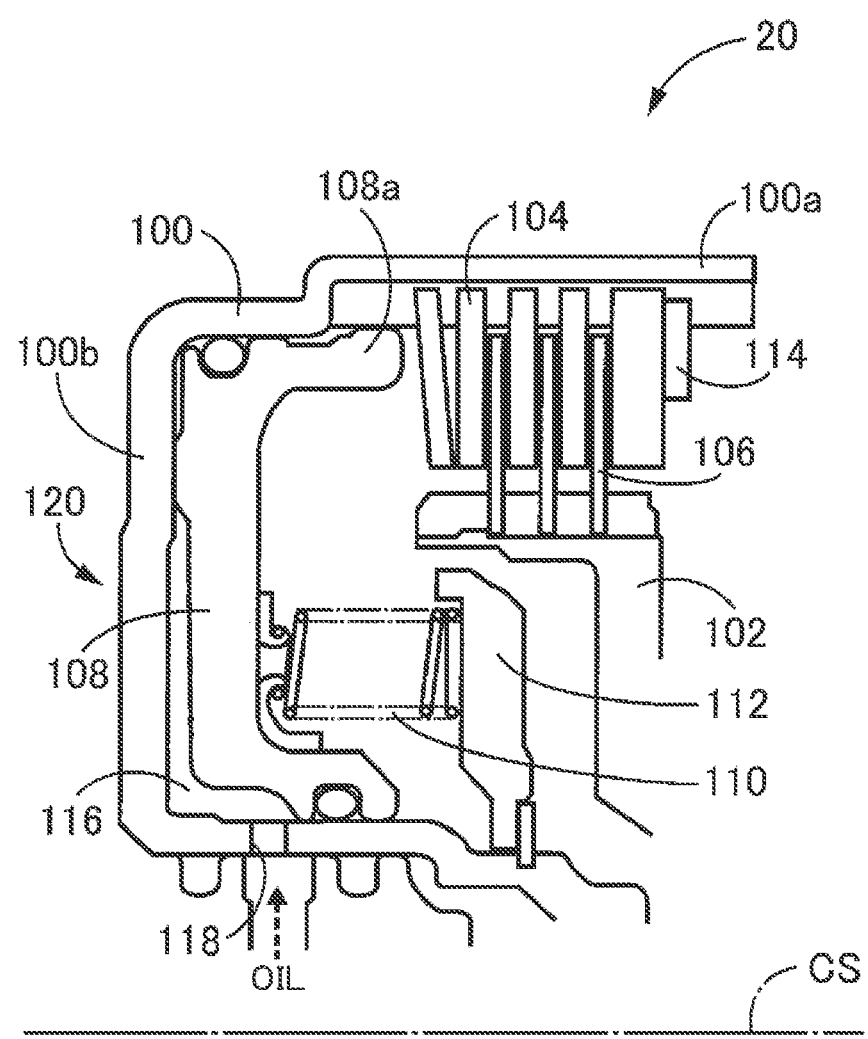
FIG. 2 is a partial sectional view illustrating an example of a K0 clutch.

FIG. 2 is a partial sectional view illustrating an example of the K0 clutch 20. In FIG. 2, the K0 clutch 20 includes a clutch drum 100, a clutch hub 102, separation plates 104, friction plates 106, a piston 108, a return spring 110, a spring receiving plate 112, and a snap ring 114. The clutch drum 100 and the clutch hub 102 are provided on an identical axis CS. FIG. 2 illustrates the radially outer peripheral portion of the K0 clutch 20 above the axis CS. The axis CS is the axis of the engine coupling shaft 34, the motor coupling shaft 36, etc. The clutch drum 100 is coupled to the engine coupling shaft 34, for example, and rotated together with the engine coupling shaft 34. The clutch hub 102 is coupled to the motor coupling shaft 36, for example, and rotated together with the motor coupling shaft 36. The separation plates 104 are spline-fitted, that is, the outer peripheral edges of a plurality of separation plates 104 in a generally annular plate shape are fitted with the inner peripheral surface of a tubular portion 100a of the clutch drum 100 so as not to be relatively rotatable. The friction plates 106 are interposed between the plurality of separation plates 104, and spline-fitted, that is, the inner peripheral edges of a plurality of friction plates 106 in a generally annular plate shape are fitted with the outer peripheral surface of the clutch hub 102 so as not to be relatively rotatable. A pressing portion 108a that extends in the direction of the separation plates 104 and the friction plates 106 is provided at the outer peripheral edge of the piston 108. The return spring 110 is interposed between the piston 108 and the spring receiving plate 112, and biases a part of the piston 108 so as to abut against a bottom plate portion 100b of the clutch drum 100. That is, the return spring 110 functions as a spring element that biases the piston 108 such that the separation plates 104 and the friction plates 106 are brought toward the disengagement side. The snap ring 114 is fixed to the tubular portion 100a of the clutch drum 100 at a position at which the separation plates 104 and the friction plates 106 are interposed between the pressing portion 108a of the piston 108 and the snap ring 114. An oil chamber 116 is formed in the K0 clutch 20 between the piston 108 and the bottom plate portion 100b of the clutch drum 100. An oil path 118 that leads to the oil chamber 116 is formed in the clutch drum 100. In the K0 clutch 20, the clutch actuator 120 as a hydraulic actuator is composed of the clutch drum 100, the piston 108, the return spring 110, the spring receiving plate 112, the oil chamber 116, etc.

The hydraulic control circuit system 56 supplies the clutch actuator 120 with a K0 hydraulic pressure PRk0 which is an adjusted hydraulic pressure. In the K0 clutch 20, when the K0 hydraulic pressure PRk0 is supplied from the hydraulic control circuit system 56 to the oil chamber 116 through the oil path 118, the piston 108 is moved by the K0 hydraulic pressure PRk0 in the direction of the separation plates 104 and the friction plates 106 against the biasing force of the return spring 110, and the pressing portion 108a of the piston 108 presses the separation plates 104 and the friction plates 106. When the separation plates 104 and the friction plates 106 are pressed, the K0 clutch 20 is switched to the engaged state. The control state of the K0 clutch 20 is switched when K0 torque Tk0 which is the torque capacity of the K0 torque 20 is varied by the K0 hydraulic pressure PRk0.

The K0 torque Tk0 is determined in accordance with the friction coefficient of the friction material of the friction plates 106, the K0 hydraulic pressure PRk0, etc., for example. In the K0 clutch 20, so-called "packing" is completed when the oil chamber 116 is filled with hydraulic oil OIL and the clearance between the separation plates 104 and the friction plates 106, that is, the pack clearance in the K0 clutch 20, is reduced and disappeared by a pushing force (=PRk0×piston pressure receiving area) of the piston 108 which resists the biasing force of the return spring 110. In the present embodiment, a state in which the pack clearance in the K0 clutch 20 is reduced and disappeared is referred to as a "packing completed state". The K0 clutch 20 generates the K0 torque Tk0 when the K0 hydraulic pressure PRk0 is further increased from the packing completed state. That is, the torque capacity of the K0 clutch 20 starts increasing when the K0 hydraulic pressure PRk0 is increased from the packing completed state of the K0 clutch 20. The K0 hydraulic pressure PRk0 for packing of the K0 clutch 20 is the K0 hydraulic pressure PRk0 for establishing a state in which the piston 108 has reached a stroke end and the K0 torque Tk0 is not generated.

Returning to FIG. 1, when the K0 clutch 20 is in the engaged state, the pump vane wheel 22a and the engine 12 are rotated together via the engine coupling shaft 34. That is, the K0 clutch 20 is engaged to couple the engine 12 and the drive wheels 14 to each other so as to be able to transmit power. When the K0 clutch 20 is in the disengaged state, on the other hand, power transmission between the engine 12 and the pump vane wheel 22a is blocked. That is, the K0 clutch 20 is disengaged to decouple the engine 12 and the drive wheels 14 from each other. The motor MG is coupled to the pump vane wheel 22a. Thus, the K0 clutch 20 is provided in the power transmission path between the engine 12 and the motor MG to function as a clutch that connects and disconnects the power transmission path, that is, a clutch that connects and disconnects the engine 12 and the motor MG. That is, the K0 clutch 20 is a clutch for connection and disconnection that is engaged to couple the engine 12 and the motor MG to each other and disengaged to decouple the engine 12 and the motor MG from each other.

In the power transmission device 16, power output from the engine 12 is transmitted from the engine coupling shaft 34 to the drive wheels 14 sequentially via the K0 clutch 20, the motor coupling shaft 36, the torque converter 22, the automatic transmission 24, the propeller shaft 28, the differential gear 30, the drive shafts 32, etc. when the K0 clutch 20 is engaged. Meanwhile, power output from the motor MG is transmitted from the motor coupling shaft 36 to the drive wheels 14 sequentially via the torque converter 22, the automatic transmission 24, the propeller shaft 28, the differential gear 30, the drive shafts 32, etc., irrespective of the control state of the K0 clutch 20.

The vehicle 10 includes an MOP 58 which is a mechanical oil pump, an EOP 60 which is an electric oil pump, a pump motor 62, etc. The MOP 58 is coupled to the pump vane wheel 22a, and rotationally driven by the drive force sources (the engine 12 and the motor MG) to discharge the hydraulic oil OIL to be used in the power transmission device 16. That is, the MOP 58 is a vehicle oil pump driven by power of the drive force sources (the engine 12 and the motor MG). The pump motor 62 is a motor exclusively for the EOP 60 for rotationally driving the EOP 60. The EOP 60 is rotationally driven by the pump motor 62 to discharge the hydraulic oil OIL. The hydraulic oil OIL discharged by the MOP 58 and the EOP 60 is supplied to the hydraulic control circuit system 56. The hydraulic control circuit system 56 supplies the CB hydraulic pressure PRcb, the K0 hydraulic pressure PRk0, the LU hydraulic pressure PR1u, etc. which are adjusted based on the hydraulic oil OIL discharged by the MOP 58 and/or the EOP 60. That is, a source pressure for the K0 hydraulic pressure PRk0 etc. is supplied from the MOP 58 and the EOP 60 to the hydraulic control circuit system 56. The hydraulic control circuit system 56 can adjust a hydraulic pressure by receiving a command value. By way of example, a hydraulic pressure is adjusted with pressure adjustment elements such as solenoid valves controlled based on a command value output to the hydraulic control circuit system 56.

The vehicle 10 further includes the electronic control unit 90 which includes a control device for the vehicle 10 associated with starting control etc. for the engine 12. The electronic control unit 90 is configured to include a so-called microcomputer that includes a central processing unit (CPU), a random access memory (RAM), a read only memory (ROM), an input/output interface, etc., for example. The CPU executes various types of control for the vehicle 10 by performing signal processing in accordance with a program stored in advance in the ROM while utilizing a temporary storage function of the RAM. The electronic control unit 90 is configured to include computers for engine control, motor control, hydraulic control, etc. as necessary.

The electronic control unit 90 is supplied with various signals (e.g. an engine rotational speed Ne which is the rotational speed of the engine 12, the turbine rotational speed Nt which is equal to the AT input rotational speed Ni, the AT output rotational speed No corresponding to a vehicle speed V, an MG rotational speed Nm which is the rotational speed of the motor MG, an accelerator operation amount θacc which is the amount of an accelerator operation by the driver which represents the magnitude of an acceleration operation by the driver, a throttle valve opening degree θth which is the opening degree of an electronic throttle valve, a brake on signal Bon which is a signal that indicates a state in which a brake pedal for actuating wheel brakes is operated by the driver, a battery temperature THbat, a battery charge/discharge current Ibat, and a battery voltage Vbat of the battery 54, a hydraulic oil temperature THoil which is the temperature of the hydraulic oil OIL in the hydraulic control circuit system 56, etc.) which are based on detection values from various sensors (e.g. an engine rotational speed sensor 70, a turbine rotational speed sensor 72, an output rotational speed sensor 74, an MG rotational speed sensor 76, an accelerator operation amount sensor 78, a throttle valve opening degree sensor 80, a brake switch 82, a battery sensor 84, an oil temperature sensor 86, etc.) provided in the vehicle 10.

The electronic control unit 90 outputs various command signals (e.g. an engine control command signal Se for controlling the engine 12, an MG control command signal Sm for controlling the motor MG, a CB hydraulic pressure control command signal Scb for controlling the engagement devices CB, a K0 hydraulic pressure control command signal Sk0 for controlling the K0 clutch 20, an LU hydraulic pressure control command signal Slu for controlling the LU clutch 40, an EOP control command signal Seop for controlling the EOP 60, etc.) to various devices (e.g. the engine control device 50, the inverter 52, the hydraulic control circuit system 56, the pump motor 62, etc.) provided in the vehicle 10.

In order to implement various types of control in the vehicle 10, the electronic control unit 90 includes a hybrid control unit 92 as hybrid control means, a clutch control unit 94 as clutch control means, and a shift control unit 96 as shift control means.

The hybrid control unit 92 includes a function as an engine control unit 92a as engine control means for controlling operation of the engine 12 and a function as a motor control unit 92b as motor control means for controlling operation of the motor MG via the inverter 52, and executes hybrid drive control etc. with the engine 12 and the motor MG through such control functions.

The hybrid control unit 92 calculates a required drive amount required for the vehicle 10 by the driver, by applying the accelerator operation amount θacc and the vehicle speed V to a required drive amount map, for example. The required drive amount map defines a relationship obtained experimentally or through design in advance, that is, a relation determined in advance. The required drive amount is required drive torque Trdem for the drive wheels 14, for example. When seen from a different point of view, the required drive torque Trdem [Nm] is required drive power Prdem [W] at the vehicle speed V at that time. A required drive force Frdem [N] for the drive wheels 14, required AT output torque for the transmission output shaft 26, etc. can also be used as the required drive amount. The required drive amount may be calculated using the AT output rotational speed No etc. in place of the vehicle speed V.

The hybrid control unit 92 outputs the engine control command signal Se for controlling the engine 12 and the MG control command signal Sm for controlling the motor MG so as to achieve the required drive power Prdem in consideration of the transmission loss, the accessory load, the speed ratio Δat of the automatic transmission 24, chargeable power Win and dischargeable power Wout of the battery 54, etc. The engine control command signal Se is a command value for engine power Pe which is power of the engine 12 which outputs engine torque Te at the engine rotational speed Ne at that time, for example. The MG control command signal Sm is a command value for power consumption Wm of the motor MG which outputs the MG torque Tm at the MG rotational speed Nm at that time, for example.

The chargeable power Win of the battery 54 is maximum power that can be input and that prescribes limitation on power input to the battery 54, and indicates limitation on input to the battery 54. The dischargeable power Wout of the battery 54 is maximum power that can be output and that prescribes limitation on power output from the battery 54, and indicates limitation on output from the battery 54. The chargeable power Win and the dischargeable power Wout of the battery 54 are calculated by the electronic control unit 90 based on the battery temperature THbat and a charge state value SOC [%] of the battery 54, for example. The charge state value SOC of the battery 54 is a value that indicates the charge state of the battery 54, and is calculated by the electronic control unit 90 based on the battery charge/discharge current Ibat and the battery voltage Vbat, for example.

When the required drive torque Trdem can be covered using only output of the motor MG, the hybrid control unit 92 sets the travel mode to a motor travel (=EV travel) mode. In the EV travel mode, the hybrid control unit 92 performs EV travel in which the vehicle travels using only the motor MG as a drive force source with the K0 clutch 20 in the disengaged state. When the required drive torque Trdem cannot be covered without using at least output of the engine 12, meanwhile, the hybrid control unit 92 sets the travel mode to an engine travel mode, that is, a hybrid travel (=HV travel) mode. In the HV travel mode, the hybrid control unit 92 performs engine travel, that is, HV travel, in which the vehicle travels using at least the engine 12 as a drive force source with the K0 clutch 20 in the engaged state. On the other hand, the hybrid control unit 92 establishes the HV travel mode when the charge state value SOC of the battery 54 is less than an engine start threshold determined in advance, the engine 12 etc. needs warming up, etc., even if the required drive torque Trdem can be covered using only output of the motor MG. The engine start threshold is a threshold determined in advance for determining that the charge state value SOC requires charging the battery 54 by forcibly starting the engine 12. In this manner, the hybrid control unit 92 switches between the EV travel mode and the HV travel mode by automatically stopping the engine 12 during EV travel, restarting the engine 12 after the engine stop, and starting the engine 12 during EV travel based on the required drive torque Trdem etc.

The hybrid control unit 92 further includes a function as an engine start determination unit 92c, that is, engine start determination means, and a function as a start control unit 92d, that is, start control means.

The engine start determination unit 92c determines the presence or absence of a start request for the engine 12. For example, the engine start determination unit 92c determines whether there is a start request for the engine 12 during the EV travel mode based on whether the required drive torque Trdem is increased beyond a range in which the required drive torque Trdem can be covered using only output of the motor MG, whether the engine 12 etc. needs warming up, whether the charge state value SOC of the battery 54 is less than the engine start threshold, etc. The engine start determination unit 92c also determines whether starting control for the engine 12 is completed.

The clutch control unit 94 controls the K0 clutch 20 so as to execute starting control for the engine 12. For example, when the engine start determination unit 92c determines that there is a start request for the engine 12, the clutch control unit 94 outputs, to the hydraulic control circuit system 56, the K0 hydraulic pressure control command signal Sk0 for controlling the K0 clutch 20 in the disengaged state toward the engaged state, so as to obtain the K0 torque Tk0 for transmitting torque required for cranking of the engine 12, which is torque for raising the engine rotational speed Ne, to the side of the engine 12. That is, the clutch control unit 94 outputs, to the hydraulic control circuit system 56, the K0 hydraulic pressure control command signal Sk0 for controlling the clutch actuator 120 so as to switch the control state of the K0 clutch 20 from the disengaged state to the engaged state, when starting the engine 12. In the present embodiment, torque required for cranking of the engine 12 is referred to as "necessary cranking torque Tcrn".

The start control unit 92d controls the engine 12 and the motor MG so as to execute starting control for the engine 12. For example, when the engine start determination unit 92c determines that there is a start request for the engine 12, the start control unit 92d outputs, to the inverter 52, the MG control command signal Sm for the motor MG to output the necessary cranking torque Tcrn in accordance with switching of the K0 clutch 20 to the engaged state by the clutch control unit 94. That is, the start control unit 92d outputs, to the inverter 52, the MG control command signal Sm for controlling the motor MG such that the motor MG outputs the necessary cranking torque Tcrn, when starting the engine 12.

When the engine start determination unit 92c determines that there is a start request for the engine 12, in addition, the start control unit 92d outputs to the engine control device 50, the engine control command signal Se for starting fuel supply, engine ignition, etc. in conjunction with cranking of the engine 12 by the K0 clutch 20 and the motor MG. That is, the start control unit 92d outputs, to the engine control device 50, the engine control command signal Se for controlling the engine 12 such that the engine 12 starts operation, when starting the engine 12.

When cranking the engine 12, cranking reaction torque Trfcr which is reaction torque that accompanies engagement of the K0 clutch 20 is generated. The cranking reaction torque Trfcr causes a sense that the vehicle 10 is pulled by the inertia, that is, a drop in drive torque Tr, during starting of the engine during EV travel. Therefore, the necessary cranking torque Tcrn which is output from the motor MG when starting the engine 12 is also the MG torque Tm for canceling the cranking reaction torque Trfcr. That is, the necessary cranking torque Tcrn is the K0 torque Tk0 which is necessary for cranking of the engine 12, and corresponds to the MG torque Tm which flows from the side of the motor MG to the side of the engine 12 via the K0 clutch 20. The necessary cranking torque Tcrn is cranking torque Tcr which is constant, for example, determined in advance based on the specifications etc. of the engine 12, for example.

When starting the engine 12 during EV travel, the start control unit 92d causes the motor MG to output the MG torque Tm in an amount corresponding to the necessary cranking torque Tcrn, in addition to the MG torque Tm for EV travel, that is, the MG torque Tm for generating the drive torque Tr. Therefore, it is necessary to secure the MG torque Tm in the amount corresponding to the necessary cranking torque Tcrn, in preparation to start the engine 12, during EV travel. Thus, the range in which the required drive torque Trdem can be covered using only output of the motor MG is the range of torque obtained by subtracting the MG torque Tm in the amount corresponding to the necessary cranking torque Tcrn from maximum torque of the motor MG that can be output. The maximum torque of the motor MG that can be output is the maximum MG torque Tm that can be output using the dischargeable power Wout of the battery 54.

The shift control unit 96 determines shifting of the automatic transmission 24 using a shift map that defines a relationship determined in advance, for example, and outputs, to the hydraulic control circuit system 56, the CB hydraulic pressure control command signal Scb for executing shift control for the automatic transmission 24 as necessary. The shift map defines a predetermined relationship having a shift line for determining shifting of the automatic transmission 24 on two-dimensional coordinates defined using the vehicle speed V and the required drive torque Trdem as variables, for example. In the shift map, the AT output rotational speed No etc. may be used in place of the vehicle speed V, and the required drive force Frdem, the accelerator operation amount θacc, the throttle valve opening degree θth, etc. may be used in place of the required drive torque Trdem.

In order for the control state of the K0 clutch 20 to be controlled precisely when starting the engine 12, a plurality of stages of progress, that is, phases, provided for each control state of the K0 clutch 20 among which switching is made in the process of starting the engine 12 is determined in advance in the electronic control unit 90 as phase definitions for K0 control Dphk0 defined for control for the clutch actuator 120.

FIG. 3 is a table indicating various phases in the phase definitions for K0 control Dphk0. In FIG. 3, the phase definitions for K0 control Dphk0 define phases such as "K0 stand-by", "quick application", "constant-pressure stand-by at time of packing", "K0 cranking", "quick drain", "constant-pressure stand-by before reengagement", "rotation synchronization initial period", "rotation synchronization middle period", "rotation synchronization final period", "engagement transition sweep", "complete engagement transition sweep", "complete engagement", "back-up sweep", and "calculation suspension".

A transition is made to the "K0 stand-by" phase when a K0 stand-by determination JMsb is made when starting control for the engine 12 is started. In the "K0 stand-by" phase, the control stands by without starting control for the K0 clutch 20 during starting control for the engine 12. The K0 stand-by determination JMsb will be discussed later.

A transition is made to the "quick application" phase when a K0 stand-by determination JMsb is not made when starting control for the engine 12 is started. Alternatively, a transition is made to the "quick application" phase from the "K0 stand-by" phase when a K0 stand-by determination JMsb is withdrawn while standing by to start control for the K0 clutch 20. In the "quick application" phase, in order for packing of the K0 clutch 20 to be quickly completed, quick application in which a command value for a high K0 hydraulic pressure PRk0 is temporarily applied is executed and the initial response of the K0 hydraulic pressure PRk0 is improved. The command value for the K0 hydraulic pressure PRk0 is a hydraulic pressure command value, that is, the K0 hydraulic pressure control command signal Sk0, for a solenoid valve for the K0 clutch 20 in the hydraulic control circuit system 56 which outputs the adjusted K0 hydraulic pressure PRk0.

A transition is made to the "constant-pressure stand-by at time of packing" phase from the "quick application" phase when quick application is completed. In the "constant-pressure stand-by at time of packing" phase, the control stands by at a constant pressure, in order for packing of the K0 clutch 20 to be completed.

A transition is made to the "K0 cranking" phase from the "constant-pressure stand-by at time of packing" phase when packing of the K0 clutch 20 is completed. In the "K0 cranking" phase, cranking of the engine 12 is performed by the K0 clutch 20.

A transition is made to the "quick drain" phase from the "K0 cranking" phase when cranking of the engine 12 is completed and a quick drain execution determination is made. In the "quick drain" phase, in order that the control can quickly stand by at a predetermined K0 hydraulic pressure PRk0, e.g. a pack end pressure, in the next, "constant-pressure stand-by before reengagement" phase, quick drain in which a command value for a low K0 hydraulic pressure PRk0 is temporarily output is executed and the initial response of the K0 hydraulic pressure PRk0 is improved.

A transition is made to the "constant-pressure stand-by before reengagement" phase from the "K0 cranking" phase when cranking of the engine 12 is completed and a quick drain execution determination is not made. Alternatively, a transition is made to the "constant-pressure stand-by before reengagement" phase from the "quick drain" phase when quick drain is completed. In the "constant-pressure stand-by before reengagement" phase, the control stands by at predetermined K0 torque Tk0 so as not to disturb complete combustion of the engine 12. Complete combustion of the engine 12 is a state in which the engine 12 is rotating stably in a self-sustained manner because of combustion of the engine 12 after initial combustion at which ignition of the engine 12 is started, for example. When complete combustion of the engine 12 is not disturbed, it is meant that self-sustained rotation of the engine 12 is not disturbed.

A transition is made to the "rotation synchronization initial period" phase from the "constant-pressure stand-by before reengagement" phase when neither a condition for a transition to the "rotation synchronization final period" phase nor a condition for a transition to the "rotation synchronization middle period" phase is met when a notification of complete combustion is received from the engine control unit 92a. The condition for a transition to the "rotation synchronization final period" phase is a condition that a K0 rotation difference ΔNk0 is equal to or less than a rotation synchronization final period transition determination rotation difference determined in advance. The K0 rotation difference ΔNk0 is the difference (=Nm−Ne) in the rotational speed of the K0 clutch 20. The condition for a transition to the "rotation synchronization middle period" phase is a condition that the condition for a transition to the "rotation synchronization final period" phase is not met and the K0 rotation difference ΔNk0 is equal to or less than a rotation synchronization middle period transition determination rotation difference determined in advance. The rotation synchronization middle period transition determination rotation difference is larger than the rotation synchronization final period transition determination rotation difference. In the "rotation synchronization initial period" phase, a rise in the engine rotational speed Ne is assisted by controlling the K0 torque Tk0, in order to quickly synchronize the engine rotational speed Ne and the MG rotational speed Nm with each other. The engine control unit 92a outputs a notification of complete combustion of the engine 12 when the elapsed time since the time when the engine rotational speed Ne has reached a complete combustion rotational speed of the engine 12 determined in advance exceeds a complete combustion notification stand-by time TMeng determined in advance (see FIG. 4B to be discussed later), for example. The complete combustion notification stand-by time TMeng is determined in advance in consideration of an exhaust gas requirement for the engine 12, for example.

A transition is made to the "rotation synchronization middle period" phase from the "constant-pressure stand-by before reengagement" phase when the condition for a transition to the "rotation synchronization middle period" phase is met when a notification of complete combustion is received from the engine control unit 92a. Alternatively, a transition is made to the "rotation synchronization middle period" phase from the "rotation synchronization initial period" phase when the condition for a transition to the "rotation synchronization middle period" phase is met during execution of the "rotation synchronization initial period" phase. In the "rotation synchronization middle period" phase, the K0 torque Tk0 is controlled such that the engine 12 has an appropriate blowing amount (=Ne−Nm).

A transition is made to the "rotation synchronization final period" phase from the "constant-pressure stand-by before reengagement" phase when the condition for a transition to the "rotation synchronization final period" phase is met when a notification of complete combustion is received from the engine control unit 92a. Alternatively, a transition is made to the "rotation synchronization final period" phase from the "rotation synchronization initial period" phase when the condition for a transition to the "rotation synchronization final period" phase is met during execution of the "rotation synchronization initial period" phase. Alternatively, a transition is made to the "rotation synchronization final period" phase from the "rotation synchronization middle period" phase when the condition for a transition to the "rotation synchronization final period" phase is met during execution of the "rotation synchronization middle period" phase. Alternatively, a transition is made to the "rotation synchronization final period" phase from the "rotation synchronization middle period" phase when shift control for the automatic transmission 24 is not performed and a state in which it is predicted that synchronization between the engine rotational speed Ne and the MG rotational speed Nm cannot be achieved is established continuously for a forcible rotation synchronization transition determination time or more during execution of the "rotation synchronization middle period" phase. Whether synchronization between the engine rotational speed Ne and the MG rotational speed Nm can be achieved is predicted based on the K0 rotation difference ΔNk0, the gradient of variation in the engine rotational speed Ne, and the gradient of variation in the MG rotational speed Nm, for example. In the "rotation synchronization final period" phase, the engine rotational speed Ne and the MG rotational speed Nm are synchronized with each other by controlling the K0 torque Tk0.

A transition is made to the "engagement transition sweep" phase from the "rotation synchronization final period" phase when a rotation synchronization determination is made during execution of the "rotation synchronization final period" phase. The rotation synchronization determination is made in accordance with whether a determination that the absolute value of the K0 rotation difference ΔNk0 is equal to or less than a rotation synchronization determination rotation difference determined in advance is made consecutively the rotation synchronization determination number of times determined in advance or more. In the "engagement transition sweep" phase, the K0 clutch 20 is brought into the engaged state by gradually increasing the K0 torque Tk0.

A transition is made to the "complete engagement transition sweep" phase from the "engagement transition sweep" phase when a K0 engagement determination is made during execution of the "engagement transition sweep" phase. The K0 engagement determination is made in accordance with whether a determination that the absolute value of the K0 rotation difference ΔNk0 is equal to or less than a complete engagement transition sweep determination rotation difference determined in advance is made consecutively the complete engagement transition sweep transition determination number of times determined in advance or more. Alternatively, a transition is made to the "complete engagement transition sweep" phase from the "engagement transition sweep" phase when a K0 rotation synchronization state cannot be maintained during execution of the "engagement transition sweep" phase. The K0 rotation synchronization state cannot be maintained when a determination that the absolute value of the K0 rotation difference ΔNk0 is more than a value obtained by adding a forcible engagement transition determination rotation difference determined in advance to the complete engagement transition sweep determination rotation difference is made consecutively the rotation separation complete engagement transition sweep transition determination number of times determined in advance or more. Alternatively, a transition is made to the "complete engagement transition sweep" phase from the "engagement transition sweep" phase when the elapsed time since the start of the "engagement transition sweep" phase is more than a forcible engagement transition determination time determined in advance and it is determined that the absolute value of the K0 rotation difference ΔNk0 is equal to or more than a complete engagement transition sweep forcible transition determination rotation difference determined in advance. In the "complete engagement transition sweep" phase, the K0 clutch 20 is brought into the completely engaged state by gradually increasing the K0 torque Tk0. When the K0 clutch 20 is brought into the completely engaged state, it is meant that the K0 torque Tk0 is increased to a state in which a safety factor that ensures engagement of the K0 clutch 20 is added, for example.

A transition is made to the "complete engagement" phase from the "complete engagement transition sweep" phase when a complete engagement determination is made during execution of the "complete engagement transition sweep" phase. The complete engagement determination is made in accordance with whether a determination that the K0 torque Tk0 is equal to or more than a value obtained by multiplying necessary K0 torque Tk0n by a safety factor (>1) determined in advance is made consecutively the complete synchronization determination number of times determined in advance or more. The necessary K0 torque Tk0n is the K0 torque Tk0 that is necessary for complete engagement of the K0 clutch 20, and is the largest value selected from the engine torque Te, the MG torque Tm, and minimum complete engagement ensuring torque, for example. The minimum complete engagement ensuring torque is the minimum K0 torque Tk0 that is necessary for complete engagement determined in advance. Alternatively, a transition is made to the "complete engagement" phase from the "complete engagement transition sweep" phase when the elapsed time since the start of the "complete engagement transition sweep" phase is equal to or more than a forcible complete engagement transition determination time determined in advance and it is determined that the absolute value of the K0 rotation difference ΔNk0 is equal to or more than a complete engagement forcible transition determination rotation difference determined in advance. In the "complete engagement" phase, the completely engaged state of the K0 clutch 20 is maintained.

A transition is made to the "complete engagement" phase also from the "back-up sweep" phase. A transition is made to the "complete engagement" phase from the "back-up sweep" phase when the complete engagement determination is made and a determination that the absolute value of the K0 rotation difference ΔNk0 is equal to or less than a back-up time rotation synchronization determination rotation difference determined in advance is made consecutively the back-up time rotation synchronization determination number of times determined in advance or more during execution of the "back-up sweep" phase. Alternatively, a transition is made to the "complete engagement" phase from the "back-up sweep" phase when the elapsed time since the transition to a phase other than the "K0 stand-by" phase after the start of starting control for the engine 12 is equal to or more than an engine starting control timeout time determined in advance and it is determined that the absolute value of the K0 rotation difference ΔNk0 is equal to or more than the complete engagement forcible transition determination rotation difference during execution of the "back-up sweep" phase.

A transition is made to the "back-up sweep" phase from the phase being executed when the elapsed time since the start of the phase being executed is more than a back-up transition determination time for the phase being executed, determined in advance, and it is determined that the K0 rotation difference ΔNk0 is equal to or more than a back-up transition determination rotation difference for the phase being executed, determined in advance, in order to suppress the control being stuck, during execution of any of the "K0 cranking" phase, the "constant-pressure stand-by before reengagement" phase, the "rotation synchronization initial period" phase, the "rotation synchronization middle period" phase, and the "rotation synchronization final period" phase. In the "back-up sweep" phase, back-up control in which the K0 clutch 20 is engaged by gradually increasing the K0 torque Tk0 is performed.

In the "calculation suspension" phase, calculation of a base correction pressure for the K0 hydraulic pressure PRk0 and required K0 torque Tk0d, which are used for starting control for the engine 12, is suspended during execution of fail-safe control when starting the engine 12. In the fail-safe control, the oil path in the hydraulic control circuit system 56 is switched so as to supply the clutch actuator 120 with a K0 hydraulic pressure PRk0 that can maintain the completely engaged state of the K0 clutch 20, not via the solenoid valve for the K0 clutch 20, when there occurs a failure in which an adjusted K0 hydraulic pressure PRk0 is not output from the solenoid valve for the K0 clutch 20 in the hydraulic control circuit system 56, for example. The K0 hydraulic pressure PRk0 that can maintain the completely engaged state is a source pressure such as a line pressure to be supplied to the solenoid valve for the K0 clutch 20 etc., for example. The base correction pressure has a value obtained by correcting the base pressure for the K0 hydraulic pressure PRk0 to be used for starting control for the engine 12 based on the hydraulic oil temperature THoil etc. The required K0 torque Tk0d is the K0 torque Tk0 which is required for cranking of the engine 12 or switching of the K0 clutch 20 to the engaged state during starting control for the engine 12.

The phase definitions for K0 control Dphk0 are prepared for the purpose of calculating the base correction pressure for the K0 hydraulic pressure PRk0 and the required K0 torque Tk0d, which are used for starting control for the engine 12, for example. In the phase definitions for K0 control Dphk0, the phases are defined based on the state of a request for control for the K0 clutch 20, to control the K0 hydraulic pressure PRk0 and the K0 torque Tk0. That is, the phase definitions for K0 control Dphk0 are defined based on a control request for switching the control state of the K0 clutch 20.

The clutch control unit 94 controls the clutch actuator 120 so as to switch the control state of the K0 clutch 20 from the disengaged state to the engaged state based on the phase definitions for K0 control Dphk0, when starting the engine 12.

The start control unit 92d controls the motor MG and the engine 12 in accordance with the control state of the K0 clutch 20, when starting the engine 12. In the starting control for the engine 12, it is only necessary that the motor MG should be controlled such that the motor MG outputs the necessary cranking torque Tcrn, and that the engine 12 should be controlled such that the engine 12 starts operation. Therefore, the start control unit 92d controls the motor MG and the engine 12 based on phases that are necessary for control for the motor MG and the engine 12, among the phase definitions for K0 control Dphk0, when starting the engine 12. Consequently, it is possible to simplify control when starting the engine 12.

Figure 4A:
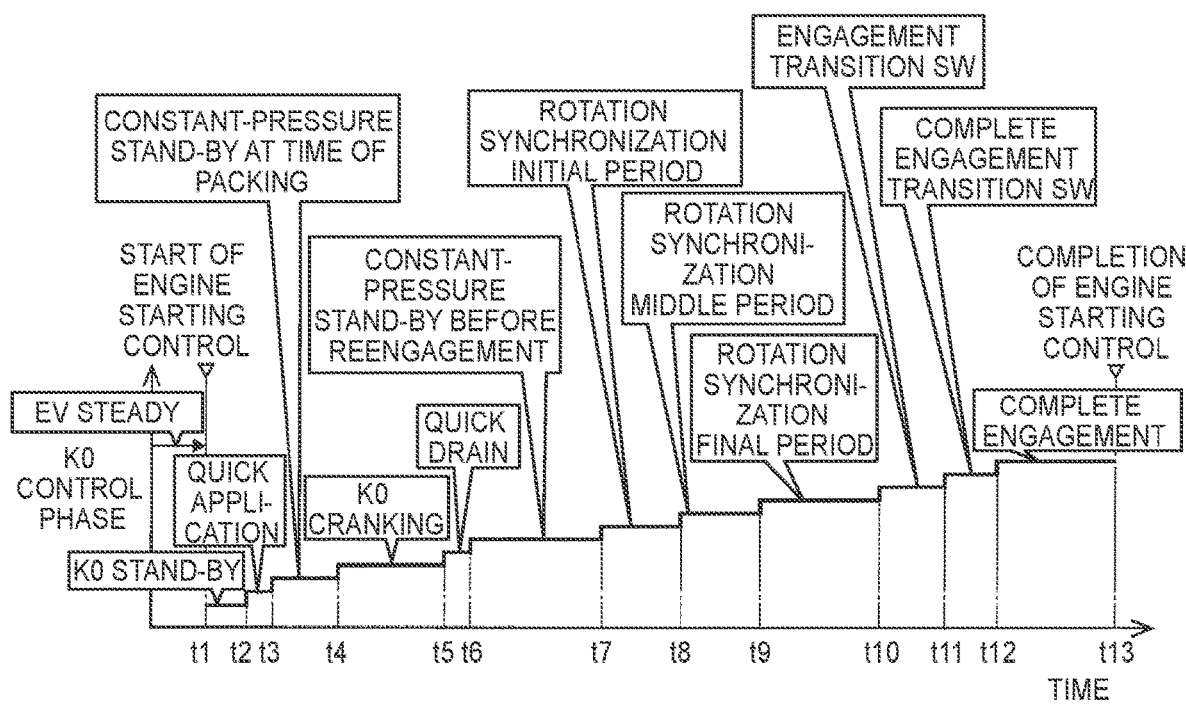
FIG. 4A illustrates an example of a time chart for a case where starting control for an engine is executed.
Figure 4B:
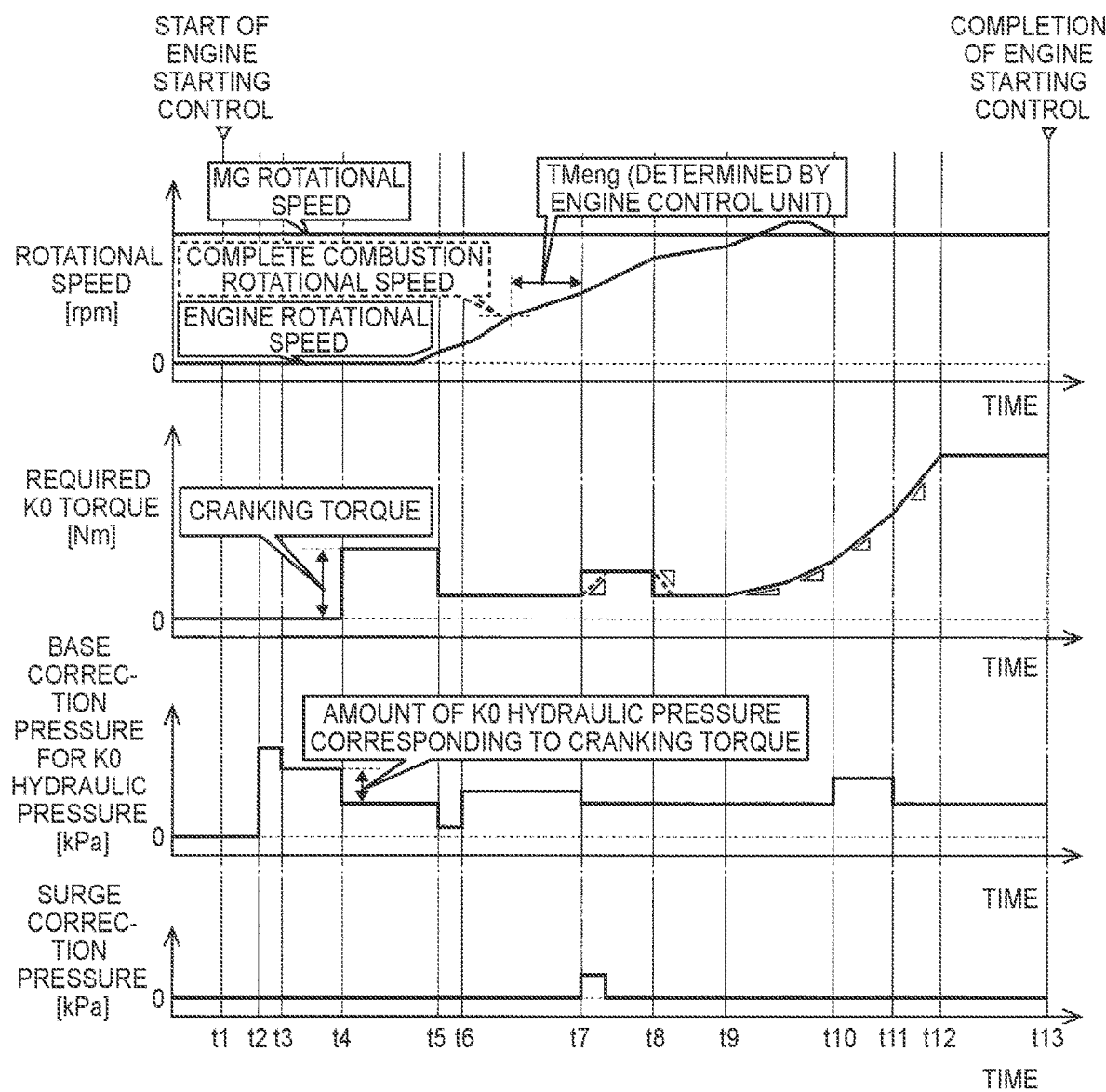
FIG. 4B illustrates an example of a time chart for a case where starting control for an engine is executed.

FIG. 4A and FIG. 4B illustrate an example of a time chart for a case where starting control for the engine 12 is executed. In FIG. 4A, "K0 control phase" indicates a transient state of the phases in the phase definitions for K0 control Dphk0. A total hydraulic pressure value obtained by adding a hydraulic pressure value obtained by converting the required K0 torque Tk0d into the K0 hydraulic pressure PRk0 to a base correction pressure for the K0 hydraulic pressure PRk0 is output as a command value for the K0 hydraulic pressure PRk0. At time t1, a start request for the engine 12 is made and starting control for the engine 12 is started in the EV travel mode, in which the vehicle is stationary in an idle state, or during EV travel. After starting control for the engine 12 is started, the "K0 stand-by" phase (see time t1 to time t2), the "quick application" phase (see time t2 to time t3), and the "constant-pressure stand-by at time of packing" phase (see time t3 to time t4) are executed. The "K0 cranking" phase is executed (see time t4 to time t5) subsequent to packing control for the K0 clutch 20. In the embodiment in FIG. 4A and FIG. 4B, the K0 hydraulic pressure PRk0 which corresponds to the necessary cranking torque Tcrn which is required in the "K0 cranking" phase is applied in the "constant-pressure stand-by at time of packing" phase. In the "constant-pressure stand-by at time of packing" phase, the actual K0 hydraulic pressure PRk0 is not raised to be equal to or more than a value at which the K0 torque Tk0 is generated. In the "K0 cranking" phase, the actual K0 hydraulic pressure PRk0 is raised to be equal to or more than a value at which the K0 torque Tk0 is generated. In the "K0 cranking" phase, the MG torque Tm with a magnitude corresponding to the required K0 torque Tk0d, that is, the necessary cranking torque Tcrn, is output from the motor MG. When the engine rotational speed Ne is raised in the "K0 cranking" phase, engine ignition etc. is started to cause initial combustion of the engine 12. When ignition starting is performed, initial combustion of the engine 12 is caused generally at the same time as the start of a rise in the engine rotational speed Ne, for example. After initial combustion of the engine 12, the "quick drain" phase (see time t5 to time t6) and the "constant-pressure stand-by before reengagement" phase (see time t6 to time t7) are executed subsequent to the "K0 cranking" phase so that complete combustion of the engine 12 is not disturbed, and a command value for the K0 hydraulic pressure PRk0 which is low is temporarily output. When an engine complete combustion notification is output from the engine control unit 92a (see time t7), the "rotation synchronization initial period" phase (see time t7 to time t8), the "rotation synchronization middle period" phase (see time t8 to time t9), the "rotation synchronization final period" phase (see time t9 to time t10), and the "engagement transition sweep ("engagement transition SW" in the drawing)" phase (see time t10 to time t11) are executed, and rotation synchronization control for the engine 12 and the motor MG is performed. The "complete engagement transition sweep ("complete engagement transition SW" in the drawing)" phase is executed (see time t11 to time t12) subsequent to the "engagement transition sweep" phase, and the K0 torque Tk0 is gradually increased to a state in which a safety factor is added to ensure engagement of the K0 clutch 20. When the K0 torque Tk0 is raised to a state in which a safety factor is added to ensure engagement of the K0 clutch 20, the "complete engagement" phase is executed (see time t12 to time t13), and the completely engaged state of the K0 clutch 20 is maintained. Time t13 indicates the time when starting control for the engine 12 is completed.

With reference to the "K0 cranking" phase in FIG. 3, FIG. 4A and FIG. 4B, the clutch control unit 94 outputs, to the hydraulic control circuit system 56, a command value for the K0 hydraulic pressure PRk0 for cranking for supplying the K0 hydraulic pressure PRk0 to the clutch actuator 120 such that the K0 clutch 20 transmits cranking torque Tcr for raising the engine rotational speed Ne during a transition of the control state of the K0 clutch 20 from the disengaged state to the engaged state, when starting the engine 12.

With reference to the "quick application" phase in FIG. 3, FIG. 4A and FIG. 4B, the clutch control unit 94 outputs, to the hydraulic control circuit system 56, a command value for the K0 hydraulic pressure PRk0 for quick application for supplying the K0 hydraulic pressure PRk0 to the clutch actuator 120 so as to quickly bring the K0 clutch 20 into the packing completed state, prior to the output of the command value for the K0 hydraulic pressure PRk0 for cranking in the "K0 cranking" phase, when starting the engine 12. The command value for the K0 hydraulic pressure PRk0 for quick application can be set to a value that is larger than the command value for the K0 hydraulic pressure PRk0 for cranking. Quick application in the "quick application" phase is also fast fill (=rapid filling) in which the oil chamber 116 of the clutch actuator 120 is quickly filled with the hydraulic oil OIL, and thus the command value for the K0 hydraulic pressure PRk0 for quick application is also a command value for the K0 hydraulic pressure PRk0 for rapid filling. In the present embodiment, the command value for the K0 hydraulic pressure PRk0 for rapid filling is referred to as a "K0 rapid filling command value Sk0ff".

With reference to the "constant-pressure stand-by at time of packing" phase in FIG. 3, FIG. 4A and FIG. 4B, the clutch control unit 94 outputs, to the hydraulic control circuit system 56, a command value for the K0 hydraulic pressure PRk0 for packing for supplying the K0 hydraulic pressure PRk0 to the clutch actuator 120 so as to bring the K0 clutch 20 into the packing completed state after the completion of quick application in the "quick application" phase, prior to the output of the command value for the K0 hydraulic pressure PRk0 for cranking in the "K0 cranking" phase, when starting the engine 12. The command value for the K0 hydraulic pressure PRk0 for packing can be set to a value that is larger than the command value for the K0 hydraulic pressure PRk0 for cranking, and can be set to a value that is not as large as the command value for the K0 hydraulic pressure PRk0 for quick application.

When the control state of the K0 clutch 20 is switched from the disengaged state to the engaged state when starting the engine 12, it is necessary to responsively raise the K0 hydraulic pressure PRk0 from zero to a maximum hydraulic pressure, for example, and therefore a proportionate flow rate of the hydraulic oil OIL is required. When control for the K0 clutch 20 is performed with an insufficient flow rate of the hydraulic oil OIL, the control state of the K0 clutch 20 may not be switched as intended, and drivability may be deteriorated because of occurrence of a starting shock, a reduction in the starting response, etc. Therefore, it is desirable that switching of the control state of the K0 clutch 20 during starting of the engine 12 should be executed when a necessary K0 switching hydraulic pressure PRk0n, which is the K0 hydraulic pressure PRk0 which is supplied from the hydraulic control circuit system 56 to the clutch actuator 120 and which is required for switching of the control state of the K0 clutch 20, is secured stably. When seen from a different point of view, it is desirable that the control should stand by without starting control for the K0 clutch 20 unless the necessary K0 switching hydraulic pressure PRk0n is secured stably when starting control for the engine 12 is started. The necessary K0 switching hydraulic pressure PRk0n is equivalent to the necessary K0 hydraulic oil flow rate FLk0n which is the flow rate of the hydraulic oil OIL which is supplied from the hydraulic control circuit system 56 to the clutch actuator 120 and which is required for switching of the control state of the K0 clutch 20.

The "K0 stand-by" phase in the phase definitions for K0 control Dphk0 discussed earlier is provided in order to address the issue discussed above, that is, in order to switch the control state of the K0 clutch 20 with the necessary K0 switching hydraulic pressure PRk0n secured stably.

With reference to the "K0 stand-by" phase and the "quick application" phase in FIG. 3, FIG. 4A and FIG. 4B, when there is a K0 stand-by determination JMsb when starting the engine 12, the clutch control unit 94 starts output of the K0 rapid filling command value Sk0ff when there is no K0 stand-by determination JMsb. When there is no K0 stand-by determination JMsb when starting the engine 12, the clutch control unit 94 starts output of the K0 rapid filling command value Sk0ff without standing by. The K0 stand-by determination JMsb is a flag that indicates the result of a determination that it is necessary to stand by without starting output of the K0 rapid filling command value Sk0ff since the necessary K0 switching hydraulic pressure PRk0n is not secured stably when starting the engine 12, for example. That is, the K0 stand-by determination JMsb is a determination to stand by made since the necessary K0 switching hydraulic pressure PRk0n is not secured stably.

Specifically, the electronic control unit 90 further includes a stand-by determination presence/absence determination unit 98, as stand-by determination presence/absence determination means, in order to implement control operation for suppressing deterioration in drivability when starting the engine 12.

When it is determined by the engine start determination unit 92c that there is a start request for the engine 12, the stand-by determination presence/absence determination unit 98 determines whether there is a K0 stand-by determination JMsb.

During a transition of shift control for the automatic transmission 24, the control state of the engagement devices CB which are involved in shift control is switched, and thus the flow rate of the hydraulic oil OIL to be consumed in the hydraulic control circuit system 56 is increased. Then, the necessary K0 hydraulic oil flow rate FLk0n during starting of the engine 12 may not be fully secured when shift control for the automatic transmission 24 and starting control for the engine 12 are executed concurrently. A transition of shift control is equivalent to the time when shift control for changing the speed ratio is being executed, for example. Such a problem tends to occur when starting control for the engine 12 is executed in cooperation with shift control for the automatic transmission 24, for example. Therefore, the stand-by determination presence/absence determination unit 98 determines that there is a K0 stand-by determination JMsb while the automatic transmission 24 is in a transition of shift control.

For an engagement-side engagement device to be switched to the engaged state, among the engagement devices CB, during a transition of shift control for the automatic transmission 24, a command value for the CB hydraulic pressure PRcb for rapid filling for supplying the CB hydraulic pressure PRcb to the engagement-side engagement device so as to quickly establish the packing completed state, in which the pack clearance in the engagement-side engagement device is reduced and disappeared, is output to the hydraulic control circuit system 56. The command value for the CB hydraulic pressure PRcb is a hydraulic pressure command value, that is, the CB hydraulic pressure control command signal Scb, for respective solenoid valves for the engagement devices CB in the hydraulic control circuit system 56 which outputs the adjusted CB hydraulic pressure PRcb. Then, there is a high possibility that the necessary K0 hydraulic oil flow rate FLk0n during starting of the engine 12 is not fully secured, particularly when a command value for the CB hydraulic pressure PRcb for rapid filling is output to the hydraulic control circuit system 56, while the automatic transmission 24 is in a transition of shift control. Therefore, while the automatic transmission 24 is in a transition of shift control, during which it is determined that there is a K0 stand-by determination JMsb, a command value for the CB hydraulic pressure PRcb for rapid filling is output to the hydraulic control circuit system 56 so as to quickly bring the engagement-side engagement device into the packing completed state, for example. The command value for the CB hydraulic pressure PRcb for rapid filling can be set to a value that is more than a CB hydraulic pressure for bringing the engagement-side engagement device into the engaged state in shift control, for example.

The hybrid control unit 92 executes MG load reduction control CTmdl, in which the load on the motor MG is reduced, when the vehicle 10 is stationary with operation of the engine 12 stopped in the EV travel mode, for example. Examples of the MG load reduction control CTmdl include creep cut control in which creep torque is not output from the motor MG when a brake on operation is performed with the vehicle stationary, for example. The creep torque is torque for causing the vehicle 10 to "creep" when a brake off operation is performed and an accelerator is kept off with the vehicle stationary, for example. In the MG load reduction control CTmdl, the MG rotational speed Nm is zero or low. Thus, the MG rotational speed Nm is low immediately after the MG load reduction control CTmdl is ended. In the EV travel mode, additionally, the MOP 58 is driven by only power of the motor MG, and thus a source pressure for the K0 hydraulic pressure PRk0 is supplied from the MOP 58, which is driven by power of the motor MG, to the hydraulic control circuit system 56 when the EOP 60 is not operating normally. Then, there is a possibility that the necessary K0 hydraulic oil flow rate FLk0n during starting of the engine 12 is not fully secured immediately after the MG load reduction control CTmdl is ended. Therefore, the stand-by determination presence/absence determination unit 98 determines that there is a K0 stand-by determination JMsb when a source pressure for the K0 hydraulic pressure PRk0 is supplied from the MOP 58, which is driven by power of the motor MG, to the hydraulic control circuit system 56 and for a period since the time when the MG load reduction control CTmdl is ended until the time when a first predetermined time TMf1 elapses. The first predetermined time TMf1 is a time determined in advance for which it is considered to be difficult to secure the necessary K0 switching hydraulic pressure PRk0n since the MG load reduction control CTmdl has just been ended, for example.

The clutch control unit 94 executes different control CTk0ao for the K0 clutch 20 that is different from switching of the control state of the K0 clutch 20 during starting of the engine 12. Examples of the different control CTk0ao for the K0 clutch 20 include dither control in which a spool in a solenoid valve for the K0 clutch 20, which outputs the K0 hydraulic pressure PRk0, is vibrated in order to discharge foreign matter etc. in the solenoid valve for the K0 clutch 20, for example. When switching of the control state of the K0 clutch 20 during starting of the engine 12 is made from a state in which the different control CTk0ao for the K0 clutch 20 is performed, the state in which the different control CTk0ao for the K0 clutch 20 is performed may affect switching of the control state of the K0 clutch 20. Then, there is a possibility that the necessary K0 switching hydraulic pressure PRk0n during starting of the engine 12 is not stable immediately after the different control CTk0ao for the K0 clutch 20 is ended. Therefore, the stand-by determination presence/absence determination unit 98 determines that there is a K0 stand-by determination JMsb when the different control CTk0ao for the K0 clutch 20 is executed and for a period since the time when the different control CTk0ao for the K0 clutch 20 is ended until the time when a second predetermined time TMf2 elapses. The second predetermined time TMf2 is a time determined in advance for which it is considered to be difficult for the necessary K0 switching hydraulic pressure PRk0n to be stable since the different control CTk0ao for the K0 clutch 20 has just been ended, for example.

The hybrid control unit 92 executes MG idling control CTmid, which is idling control for the motor MG, when the vehicle 10 is stationary with operation of the engine 12 stopped in the EV travel mode, for example. In the MG idling control CTmid, the MG rotational speed Nm is maintained at an MG idling rotational speed Nmidl, which is an idling rotational speed of the motor MG determined in advance, for example. The MG idling rotational speed Nmidl is the MG rotational speed Nm in the MG idling control CTmid. One of the MG idling control CTmid and the MG load reduction control CTmdl is used depending on the vehicle state, for example. In the MG idling control CTmid, the MG idling rotational speed Nmidl is occasionally fluctuated in accordance with the vehicle state. The MG torque Tm is also fluctuated along with fluctuations in the MG idling rotational speed Nmidl. In the EV travel mode, additionally, the MOP 58 is driven by only power of the motor MG, and thus a source pressure for the K0 hydraulic pressure PRk0 is supplied from the MOP 58, which is driven by power of the motor MG, to the hydraulic control circuit system 56 when the EOP 60 is not operating normally. Then, there is a possibility that the MG rotational speed Nm or the MG torque Tm is unstable and the necessary K0 hydraulic oil flow rate FLk0n during starting of the engine 12 is not stable while or immediately after the MG idling rotational speed Nmidl is fluctuating. Therefore, the stand-by determination presence/absence determination unit 98 determines that there is a K0 stand-by determination JMsb while the MG idling rotational speed Nmidl is fluctuating, or for a period since the time when fluctuations in the MG idling rotational speed Nmidl subside until the time when a third predetermined time TMf3 elapses, when a source pressure for the K0 hydraulic pressure PRk0 is supplied from the MOP 58, which is driven by power of the motor MG, to the hydraulic control circuit system 56. The time when fluctuations in the MG idling rotational speed Nmidl subside corresponds to the time when fluctuations in the MG idling rotational speed Nmidl have fallen in a predetermined range in a predetermined period. The third predetermined time TMf3 is a time determined in advance for which it is considered to be difficult for the necessary K0 switching hydraulic pressure PRk0n to be stable since the MG idling rotational speed Nmidl has just been fluctuated, for example.

The clutch control unit 94 controls switching of the control state of the LU clutch 40. For example, the clutch control unit 94 outputs, to the hydraulic control circuit system 56, the LU hydraulic pressure control command signal Slu for supplying the LU clutch 40 with the LU hydraulic pressure PRlu at which the control state of the LU clutch 40 determined based on the vehicle state is established. When the LU clutch 40 is in the completely disengaged state, the torque converter 22 is in a torque converter state, in which the hydraulic oil OIL flows between the pump vane wheel 22*a* and the turbine vane wheel 22*b*. When the LU clutch 40 is in the completely engaged state, on the other hand, the torque converter 22 is in a lock-up state, in which the hydraulic oil OIL does not flow between the pump vane wheel 22*a* and the turbine vane wheel 22*b*. During a transition in which the control state of the LU clutch 40 is switched, the flow rate of the hydraulic oil OIL for the LU clutch 40 is fluctuated. Then, there is a possibility that the necessary K0 hydraulic oil flow rate FLk0n during starting of the engine 12 is not stable during or immediately after switching of the control state of the LU clutch 40. Therefore, the stand-by determination presence/absence determination unit 98 determines that there is a K0 stand-by determination JMsb during switching of the control state of the LU clutch 40, or for a period since the time when switching of the control state of the LU clutch 40 is completed until the time when a fourth predetermined time TMf4 elapses. The fourth predetermined time TMf4 is a time determined in advance for which it is considered to be difficult for the necessary K0 switching hydraulic pressure PRk0n to be stable since the control state of the LU clutch 40 has just been switched, for example.

When it is determined by the stand-by determination presence/absence determination unit 98 that there is a K0 stand-by determination JMsb when starting the engine 12, a transition is made to the "K0 stand-by" phase, and the clutch control unit 94 stands by to control the K0 clutch 20, that is, to output the K0 rapid filling command value Sk0ff. When it is determined by the stand-by determination presence/absence determination unit 98 that there is no K0 stand-by determination JMsb, that is, the K0 stand-by determination JMsb is withdrawn, after a transition to the "K0 stand-by" phase, a transition is made to the "quick application" phase, and the clutch control unit 94 starts output of the K0 rapid filling command value Sk0ff which has been suspended. When it is determined by the stand-by determination presence/absence determination unit 98 that there is a K0 stand-by determination JMsb when starting the engine 12, a transition is made to the "quick application" phase, and the clutch control unit 94 starts output of the K0 rapid filling command value Sk0ff.

Figure 5:
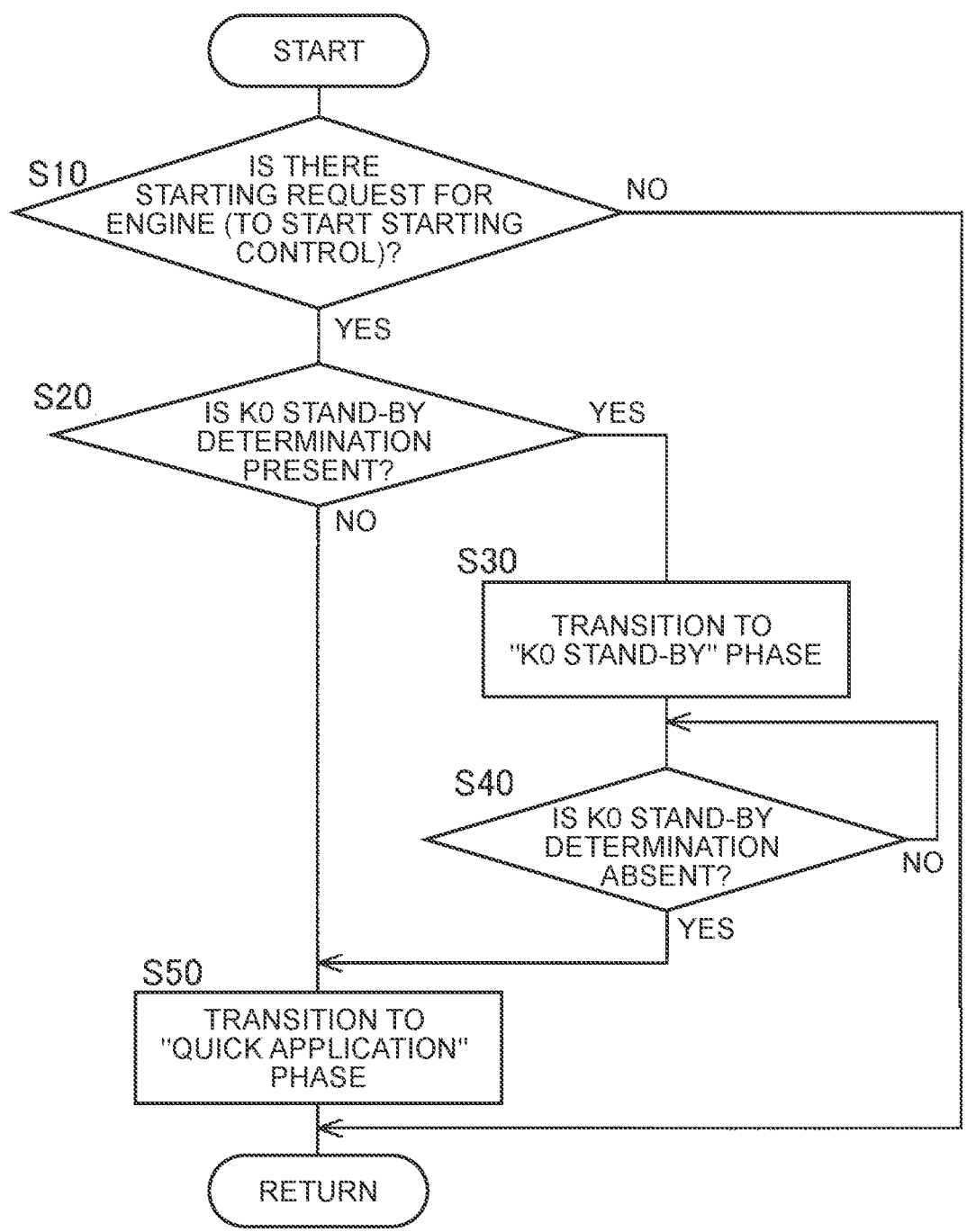
FIG. 5 is a flowchart illustrating an essential portion of control operation of an electronic control unit, illustrating control operation for suppressing deterioration in drivability when starting the engine.

FIG. 5 is a flowchart illustrating an essential portion of control operation of the electronic control unit 90, illustrating control operation for suppressing deterioration in drivability when starting the engine 12, the control operation being executed repeatedly, for example.

In FIG. 5, first, in step (hereinafter the word "step" will be omitted) S10 which corresponds to the function of the engine start determination unit 92*c*, it is determined whether there is a start request for the engine 12. That is, it is determined whether starting control for the engine 12 is started. When the determination in S10 is denied, the present routine is ended. When the determination in S10 is affirmed, it is determined in S20, which corresponds to the function of the stand-by determination presence/absence determination unit 98, whether there is a K0 stand-by determination JMsb. When the determination in S20 is affirmed, a transition is made to the "K0 stand-by" phase in S30, which corresponds to the function of the clutch control unit 94. Then, in S40 which corresponds to the function of the stand-by determination presence/absence determination unit 98, it is determined whether the K0 stand-by determination JMsb is absent. When the determination in S40 is denied, S40 is repeatedly executed. When the determination in S20 is denied, or when the determination in S40 is affirmed, a transition is made to the "quick application" phase in S50, which corresponds to the function of the clutch control unit 94.

In the present embodiment, as discussed above, when there is a K0 stand-by determination JMsb when starting the engine 12, output of the K0 rapid filling command value Sk0ff is started when there is no K0 stand-by determination JMsb. Thus, the engine 12 can be started appropriately when the necessary K0 switching hydraulic pressure PRk0n during starting of the engine 12 is secured stably. For example, output of the K0 rapid filling command value Sk0ff can be started after waiting for a state in which the control state of the K0 clutch 20 can be switched reliably and stably, and the initial response of the K0 hydraulic pressure PRk0 for the clutch actuator 120 can be improved as intended. Hence, it is possible to suppress deterioration in drivability when starting the engine 12.

When the control state of the K0 clutch 20 is not switched as intended when starting the engine 12, the energy efficiency may be deteriorated, besides the deterioration in drivability. In the present embodiment, in contrast, when there is a K0 stand-by determination JMsb when starting the engine 12, output of the K0 rapid filling command value SkOff is started when there is no K0 stand-by determination JMsb. Thus, it is possible to suppress deterioration in the energy efficiency.

In the present embodiment, in addition, it is determined that there is a K0 stand-by determination JMsb while the automatic transmission 24 is in a transition of shift control. Thus, the control stands by to start output of the K0 rapid filling command value SkOff when there is a possibility that it is difficult to secure the necessary K0 hydraulic oil flow rate FLk0n during starting of the engine 12 since the automatic transmission 24 is in a transition of shift control.

In the present embodiment, in addition, while the automatic transmission 24 is in a transition of shift control, a command value for the CB hydraulic pressure PRcb for rapid filling is output to the hydraulic control circuit system 56 so as to quickly bring the engagement-side engagement device into the packing completed state during a transition of shift control for the automatic transmission 24. Thus, the control stands by to start output of the K0 rapid filling command value SkOff during control for quickly bringing the engagement-side engagement device into the packing completed state, during which there is a high possibility that it is difficult to secure the necessary K0 hydraulic oil flow rate FLk0n during starting of the engine 12.

In the present embodiment, in addition, it is determined that there is a K0 stand-by determination JMsb for a period since the time when the MG load reduction control CTmdl is ended until the time when the first predetermined time TMf1 elapses. Thus, the control stands by to start output of the K0 rapid filling command value SkOff when there is a possibility that it is difficult to secure the necessary K0 hydraulic oil flow rate FLk0n during starting of the engine 12 since the rotational speed of the motor MG which drives the MOP 58 is low, such as immediately after the MG load reduction control CTmdl is ended.

In the present embodiment, in addition, it is determined that there is a K0 stand-by determination JMsb for a period since the time when the different control CTk0ao for the K0 clutch 20 is ended until the time when the second predetermined time TMf2 elapses. Thus, the control stands by to start output of the K0 rapid filling command value SkOff when there is a possibility that it is difficult to stabilize the necessary K0 switching hydraulic pressure PRk0n during starting of the engine 12 because of the effect of the different control CTk0ao, such as immediately after the different control CTk0ao for the K0 clutch 20 is ended.

In the present embodiment, in addition, it is determined that there is a K0 stand-by determination JMsb while the MG idling rotational speed Nmidl is fluctuating, or for a period since the time when fluctuations in the MG idling rotational speed Nmidl subside until the time when the third predetermined time TMf3 elapses. Thus, the control stands by to start output of the K0 rapid filling command value SkOff when there is a possibility that it is difficult to stabilize the necessary K0 hydraulic oil flow rate FLk0n during starting of the engine 12 since the rotational speed or output torque of the motor MG which drives the MOP 58 is unstable, such as while or immediately after the MG idling rotational speed Nmidl is fluctuating.

In the present embodiment, in addition, it is determined that there is a K0 stand-by determination JMsb during switching of the control state of the LU clutch 40, or for a period since the time when switching of the control state of the LU clutch 40 is completed until the time when the fourth predetermined time TMf4 elapses. Thus, the control stands by to start output of the K0 rapid filling command value SkOff when there is a possibility that it is difficult to stabilize the necessary K0 hydraulic oil flow rate FLk0n during starting of the engine 12 since the control state of the LU clutch 40 is varying or has just varied.

In the present embodiment, in addition, when there is no K0 stand-by determination JMsb when starting the engine 12, output of the K0 rapid filling command value SkOff is started without standing by. Thus, the engine 12 can be started quickly when the necessary K0 switching hydraulic pressure PRk0n during starting of the engine 12 is secured stably.

While an embodiment of the present disclosure has been described in detail above with reference to the drawings, the present disclosure is also applicable to other aspects.

For example, in the embodiment discussed above, the engine 12 is started by igniting the engine 12 in accordance with cranking of the engine 12 in a transient state in which the K0 clutch 20 is switched from the disengaged state to the engaged state, and raising the engine rotational speed Ne of the engine 12 itself. However, the present disclosure is not limited thereto. For example, the engine 12 may be started by igniting the engine 12 after cranking the engine 12 until the K0 clutch 20 is brought to the completely engaged state or a state that is close to the completely engaged state etc. When the vehicle 10 is stationary with the MG rotational speed Nm at zero, the engine 12 can be started by igniting the engine 12 after the engine 12 is cranked by the motor MG with the K0 clutch 20 in the completely engaged state. In the case where the vehicle 10 is provided with a starter which is a motor exclusively for cranking the engine 12, and when the vehicle 10 is stationary with the MG rotational speed Nm at zero and the engine 12 cannot be sufficiently cranked by the motor MG because of an extremely low outside temperature, for example, the engine 12 may be started by igniting the engine 12 after the engine 12 is cranked by the starter.

In the embodiment discussed earlier, the automatic transmission 24 of a planetary gear type is indicated as an example of the automatic transmission which is provided between the motor MG and the drive wheels 14 in the power transmission path between the engine 12 and the drive wheels 14. However, the present disclosure is not limited thereto. The automatic transmission may be a parallel two-axis automatic transmission of a synchronous meshing type including a known dual clutch transmission (DCT), a known belt-type continuously variable transmission, etc. The DCT is a parallel two-axis automatic transmission of a synchronous meshing type in which input shafts for two systems are provided and engagement devices are connected to the input shafts for the two systems, respectively, to be further connected to even-numbered gears and odd-numbered gears, respectively. The engagement devices which are connected to the input shafts for the two systems, respectively, correspond to the engagement devices CB of the automatic transmission 24. In a known continuously variable transmission of a belt type, the flow rate of hydraulic oil OIL to be supplied to pulleys is increased during a transition of shift control, for example, in some cases. The present disclosure is useful for such cases.

In the embodiment discussed earlier, the torque converter 22 is used as a hydraulic power transmission device. However, the present disclosure is not limited thereto. For example, a different hydraulic power transmission device that does not have a torque amplification function, such as a fluid coupling, may be used as the hydraulic power transmission device in place of the torque converter 22. The hydraulic power transmission device may not necessarily be provided.

The above discussion merely introduces an embodiment, and the present disclosure can be implemented in aspects in which a variety of modifications and improvements are made based on the knowledge of a person skilled in the art.

What is claimed is:

1. A control device for a vehicle including an engine, a motor coupled to a power transmission path between the engine and drive wheels so as to be able to transmit power, a clutch that is provided between the engine and the motor in the power transmission path and a control state of which is switchable by controlling a hydraulic clutch actuator, and a hydraulic control circuit system that supplies an adjusted hydraulic pressure to the clutch actuator, the control device comprising an electronic control unit configured to:

output a first command value to the hydraulic control circuit system and then output a second command value to the hydraulic control circuit system during a transition in which the control state of the clutch is switched from a disengaged state to an engaged state when starting the engine, the second command value being a command value for supplying the hydraulic pressure to the clutch actuator such that the clutch transmits cranking torque for raising a rotational speed of the engine, and the first command value being a command value for supplying the hydraulic pressure to the clutch actuator so as to reduce a pack clearance in the clutch;

perform first control in which the motor outputs the cranking torque, and second control in which the engine starts operation, when starting the engine; and when the vehicle is in a predetermined state in which a required hydraulic pressure is not secured stably when starting the engine, start output of the first command value when the vehicle is not in the predetermined state, the required hydraulic pressure being a hydraulic pressure supplied from the hydraulic control circuit system to the clutch actuator and required to switch the control state of the clutch.

2. The control device according to claim 1, wherein the vehicle is in the predetermined state when an automatic transmission is in a transition of shift control, the automatic transmission being provided between the motor and the drive wheels to establish different gear ratios in accordance with the hydraulic pressure adjusted by and supplied from the hydraulic control circuit system.

3. The control device according to claim 2, wherein:

the automatic transmission is configured to include plurality of hydraulic engagement devices to each of which the adjusted hydraulic pressure is supplied from the hydraulic control circuit system, and establish one of a plurality of gear stages through engagement of any of the hydraulic engagement devices;

the automatic transmission is in the transition of the shift control when a third command value for supplying the hydraulic pressure to an engagement-side engagement device so as to reduce a pack clearance in the engagement-side engagement device is output to the hydraulic control circuit system; and the engagement-side engagement device is an engagement device to be switched to the engaged state, among the engagement devices.

4. The control device according to claim 1, wherein the vehicle is in the predetermined state for a period since a time when control that is executed when the vehicle is stationary with operation of the engine stopped and in which a load on the motor is reduced is ended until a time when a first predetermined time for which it is considered to be difficult to secure the required hydraulic pressure elapses, when a source pressure for the hydraulic pressure to be supplied to the clutch actuator is supplied from a vehicle oil pump that is driven by power of the motor to the hydraulic control circuit system.

5. The control device according to claim 1, wherein the vehicle is in the predetermined state for a period since a time when different control for the clutch that is different from switching of the control state of the clutch during starting of the engine is ended until a time when a second predetermined time for which it is considered to be difficult to stabilize the required hydraulic pressure elapses, when the different control for the clutch is executed.

6. The control device according to claim 1, wherein, when a source pressure for the hydraulic pressure to be supplied to the clutch actuator is supplied from a vehicle oil pump that is driven by power of the motor to the hydraulic control circuit system, the vehicle is in the predetermined state while:

a rotational speed of the motor is fluctuating in idling control for the motor executed when the vehicle is stationary with operation of the engine stopped; or a period since a time when fluctuations in the rotational speed of the motor in the idling control subside until a time when a third predetermined time for which it is considered to be difficult to stabilize the required hydraulic pressure elapses.

7. The control device according to claim 1, wherein the vehicle is in the predetermined state during:

switching of a control state of a direct clutch; or a period since a time when the switching of the control state of the direct clutch is completed until a time when a fourth predetermined time for which it is considered to be difficult to stabilize the required hydraulic pressure elapses, wherein the direct clutch is a clutch that couples input and output rotary members of a hydraulic power transmission device provided between the motor and the drive wheels in the power transmission path and the control state of which is switchable in accordance with the hydraulic pressure adjusted by and supplied from the hydraulic control circuit system.

8. The control device according to claim 1, wherein the electronic control unit is configured to start output of the first command value without standing by when the vehicle is not in the predetermined state when starting the engine.

* * * * *